(12) United States Patent
Shimojo et al.

(10) Patent No.: US 7,363,891 B2
(45) Date of Patent: Apr. 29, 2008

(54) PLANT CONTROL

(75) Inventors: Kanako Shimojo, Saitama (JP); Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 57 days.

(21) Appl. No.: 11/367,704

(22) Filed: Mar. 6, 2006

(65) Prior Publication Data
US 2006/0243232 A1 Nov. 2, 2006

(30) Foreign Application Priority Data
Apr. 28, 2005 (JP) ............... 2005-131410

(51) Int. Cl.
*F01L 1/34* (2006.01)
(52) U.S. Cl. ............... 123/90.15; 123/90.16; 123/90.17
(58) Field of Classification Search ............ 123/90.15, 123/90.16, 90.17, 90.31

See application file for complete search history.

(56) References Cited

U.S. PATENT DOCUMENTS
2003/0094151 A1* 5/2003 Yasui ............... 123/90.17

FOREIGN PATENT DOCUMENTS
JP 2005-023922 A 1/2005

\* cited by examiner

*Primary Examiner*—Zelalem Eshete
(74) *Attorney, Agent, or Firm*—Arent Fox LLP

(57) ABSTRACT

A plant control includes determining a control input into the plant to cause a control output of the plant to converge to a desired value. A value of at least one parameter for adjusting a speed of change of the control output relative to change of the desired value is determined in accordance with a plant condition. The control input is determined based on the parameter having the value thus determined. The parameter includes a first parameter for changing a speed of change of the control input relative to change of the desired value. The parameter can also include a second parameter for changing the relative speed via a corrected desired value that is determined by correcting the desired value. The second parameter can further include a gradient parameter and a gradually-approaching characteristic parameter.

36 Claims, 16 Drawing Sheets

PLANT CONTROL

BACKGROUND OF THE INVENTION

The present invention relates to a plant control that is capable of efficiently suppressing that a control output overshoots a desired value and that the control output lags behind the desired value.

Conventionally, there have been proposed several techniques for controlling a modeled object (such an object is also referred to as a plant). An example is disclosed in Japanese Patent Application Publication No. 2005-023922. Through use of a response assignment control, an output of a plant (that is, a control output) can converge to a desired value at a desired speed. In particular, according to a 2-degree-of-freedom response assignment control, both of a speed with which the control output follows a desired value and a speed with which an error between the control output and the desired value converges to zero when disturbance is applied to the plant can be separately specified.

When a plant has nonlinear characteristics, the control output may overshoot a desired value and/or the control output may lag behind the desired value even though the response assignment control is used. Such overshooting and delay occur, for example, due to a mechanical friction or a nonlinear element such as a spring that acts in one direction.

FIG. 19 is an example of such overshooting and delay when a lift amount of an intake or exhaust valve of an internal-combustion engine is controlled. Referring to FIG. 19(a), a desired value Lift_cmd_f (which is, more specifically, a filtered desired value Lift_cmd_f as described later) and an actually-detected lift amount Lift when the valve is opened at time t1 are shown. It is seen that there is a delay with which the lift amount Lift follows the desired value Lift_cmd_f. Referring to FIG. 19(b), the desired value Lift_cmd_f and the actually-detected lift amount Lift when the valve is closed at time t2 are shown. It is seen that the lift amount Lift overshoots the desired value. Such delay and overshooting may be caused by an actuator (a plant) that drives the valve. For example, the actuator is provided with a return spring that is biased in a direction of a closed position of the valve. When the valve is closed, the restoring force of the spring may cause the control output (lift amount) to overshoot a desired value. When the valve is opened, a delay may occur before the control output reaches the desired value because the valve is moved against the biasing force of the spring.

Such overshooting and delay may reduce the emission, fuel efficiency and drivability. Furthermore, such overshooting may damage the actuator.

However, if overshooting is suppressed too much, a delay with which the control output follows a desired value may increase. If a delay with which the control output follows a desired value is suppressed too much, overshooting may increase.

Thus, there is a need for a control that is capable of improving robustness against a plant that exhibits nonlinear characteristics while efficiently suppressing overshooting and delay of the control output relative to a desired value.

SUMMARY OF THE INVENTION

According to one aspect of the present invention, a plant control is provided. The plant control includes determining a control input into the plant to cause a control output of the plant to converge to a desired value. A value of at least one parameter for adjusting a speed of change of the control output relative to change of the desired value is determined in accordance with a plant condition. The control input is determined based on the parameter having the value thus determined.

According to this invention, overshooting and delay of the control output can be suppressed because a speed of change of the control output relative to the desired value can be determined by the parameter in accordance with a plant condition.

According to one embodiment of the present invention, the parameter includes a first parameter for changing a speed of change of the control input relative to change of the desired value. The control input is determined based on the first parameter. Thus, the speed of change of the control output is controlled by adjusting the speed of change of the control input based on the first parameter.

According to one embodiment of the present invention, the first parameter is a parameter (Keq_r) that weighs at least one of components comprising the control input. Because the speed of change of the control input can be controlled through the weight assigned by the first parameter, the speed of change of the control output is appropriately controlled.

According to one embodiment of the present invention, one of the components of the control input is a feed-forward term that is determined based on the desired value. The feed-forward term reacts well to change of the desired value. Therefore, the speed of change of the control input can be desirably adjusted by weighting the feed-forward term.

According to one embodiment of the present invention, a response assignment control is performed. This control is capable of specifying a speed with which the control output converges to the desired value. The at least one of components comprising the control input is an equivalent control input for confining a state quantity of the plant on a switching line defined in the response assignment control. Thus, the speed of change of the control input can be adjusted by weighting the equivalent control input that mainly determines the behavior of the control input.

According to another embodiment of the present invention, the parameter includes a second parameter for changing the relative speed via a corrected desired value. The corrected desired value is generated in accordance with the second parameter. The control input is determined so that the control output follows the corrected desired value. Thus, the speed of change of the control output can be controlled by determining the control input based on the corrected desired value generated according to the second parameter.

According to one embodiment of the present invention, the second parameter includes a gradient parameter (Lrate). A ramp-shaped signal having a gradient corresponding to the gradient parameter relative to change of the desired value is generated as the corrected desired value. Because the control input is determined so that the control output follows the ramp-shaped signal, the speed of change of the control output can be changed in accordance with the gradient parameter.

According to one embodiment of the present invention, the second parameter includes a gradually-approaching characteristic parameter (POLE_f). An exponential-function-shaped signal having a gradually-approaching characteristic corresponding to the gradually-approaching characteristic parameter relative to change of the desired value is generated as the corrected desired value. Because the control input is determined so that the control output follows the exponential-function-shaped signal, the speed of change of the control output can be changed in accordance with the gradually-approaching characteristic parameter.

According to one embodiment of the present invention, when the plant reaches a condition where there is a possibility that overshooting occurs, the parameter is set to a first value to decrease the relative speed. When the plant exits the condition, the parameter is reset to a second value to restore the relative speed. Thus, even when there is a possibility of overshooting, the overshooting is avoided by decreasing the speed of change of the control output. Otherwise, the capability that the control output follows the desired value is kept at a high level by restoring the relative speed.

According to another embodiment of the present invention, when the plant reaches a condition where there is a possibility that overshooting occurs, the parameter is set to a first value to decrease the relative speed. When the plant reaches a condition where there is a possibility that a delay with which the control output follows the desired value occurs, the parameter is set to a second value to increase the relative speed. Thus, overshooting and delay of the control output can be avoided by switching the parameter value in accordance with the plant condition.

According to one embodiment of the present invention, the plant condition includes a speed of change of the desired value. Thus, in accordance with the speed of change of the desired value, the speed of change of the control output can be adjusted to suppress overshooting and delay.

The present invention can be applied to various plants. According to one embodiment of the present invention, the plant is a lift mechanism that is capable of changing a lift amount of a valve disposed in an engine. The value of the above-described parameter can be determined in accordance with whether the valve is being closed or opened.

In general, the lift mechanism acts differently between when the valve is being closed and when the valve is being opened. According to this invention, overshooting and delay of the lift amount relative to a desired value can be suppressed by the parameter, so that the behavior of the valve can be made stable both when the valve is being closed and when the valve is being opened.

DESCRIPTION OF THE PREFERRED EMBODIMENTS

Figure 1:
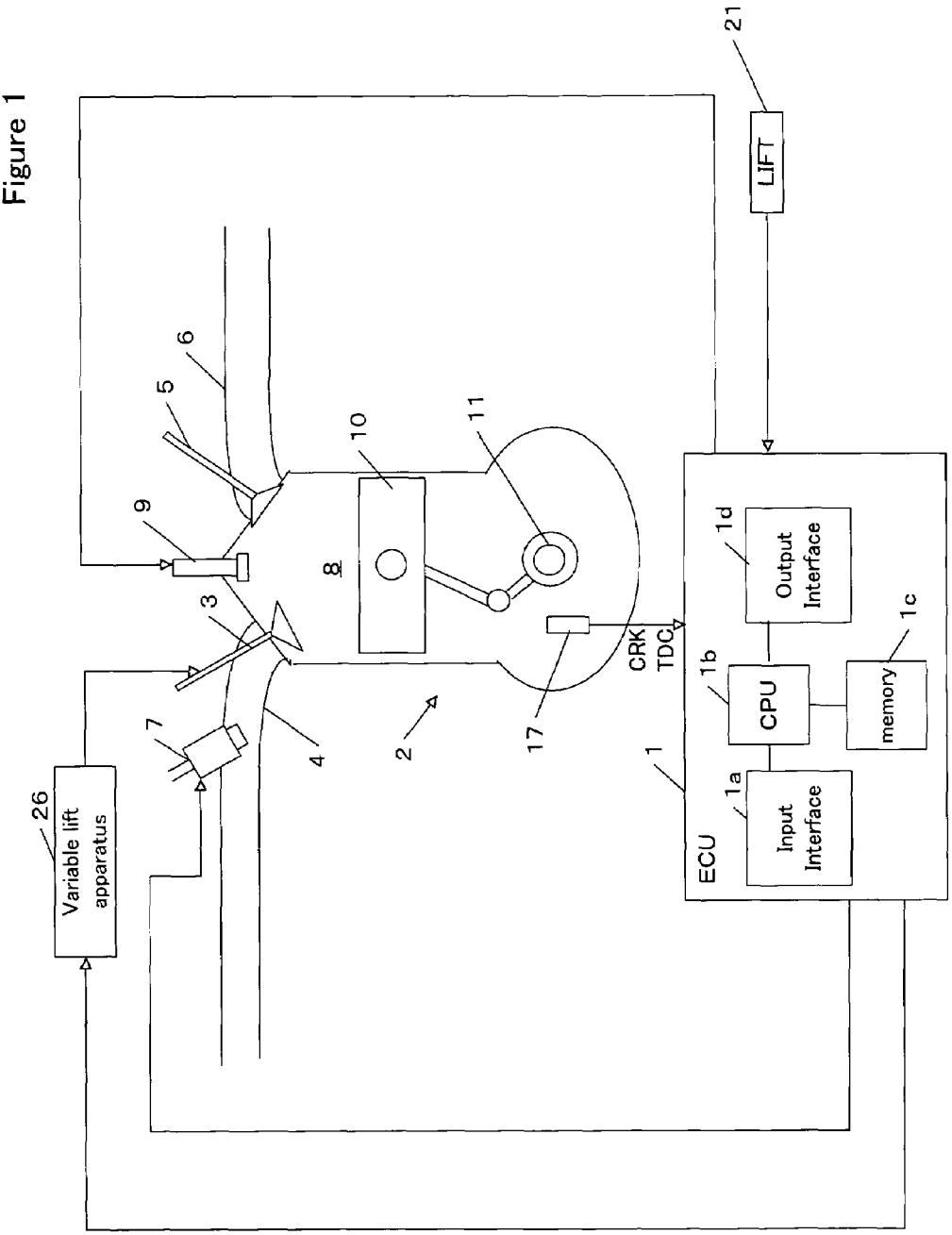
FIG. 1 is a block diagram of an engine and its control unit in accordance with one embodiment of the present invention.

Referring to the drawings, specific embodiments of the invention will be described. FIG. 1 is a block diagram showing an internal combustion engine (hereinafter referred to as an engine) and a control unit for the engine in accordance with one embodiment of the invention.

An electronic control unit (hereinafter referred to as an ECU) 1 is essentially a computer including a CPU 1$b$. The ECU 1 comprises a memory 1$c$ including a read only memory (ROM) and a random access memory (RAM). The ROM stores one or more programs for controlling various parts of the vehicle and one or more maps required for implementing the programs. The RAM provides work areas for operation by the CPU 1$b$, in which data and programs can be temporarily stored. The ECU 1 further comprises an input interface 1$a$ for receiving data sent from each part of the vehicle and an output interface 1$d$ for sending a control signal to each part of the vehicle.

An engine 2 is, for example, a 4-cylinder 4-cycle engine. For the purpose of simplicity, one of the cylinders is shown in the figure. The chamber 8 of the engine 2 is connected to an intake manifold 4 through an air intake valve 3 and connected to an exhaust manifold 6 through an exhaust valve 5. A fuel injection valve 7 for injecting fuel in accordance with a control signal from the ECU 1 is disposed in the intake manifold 4. A spark plug 9 is provided in the combustion chamber 8 to ignite a spark in accordance with an ignition timing signal from the ECU 1.

The engine 2 takes air-fuel mixture from the air taken from the intake manifold 4 and the fuel injected by the fuel injection valve 7 into the combustion chamber 8. The air-fuel mixture is burned by a spark provided by the spark plug 9. The combustion increases the volume of the mixture, which pushes the piston 10 down. The reciprocating motion of the piston 10 is converted into the rotation motion of the crankshaft 11. In a 4-cycle engine, one engine cycle consists of 4 strokes: intake, compression, combustion and exhaust strokes. During one engine cycle, the piston 10 moves up and down four times (strokes).

A crank angle sensor 17 is disposed in the engine 2. The crank angle sensor 17 outputs a CRK signal and a TDC signal to the ECU 1 in accordance with the rotation of the crankshaft 11.

The CRK signal is a pulse signal that is output at every predetermined crank angle. The ECU 1 calculates a rotational speed NE of the engine 2 in accordance with the CRK signal. The TDC signal is also a pulse signal that is output at a crank angle associated with the TDC (top dead center) position of a piston 10.

A lift amount sensor 21 is connected to the ECU 1. The lift amount sensor 21 detects the amount of lift "Lift" of the intake valve 3 (and/or the exhaust valve 5) and sends it to the ECU 1. In this example, the lift amount "Lift" is detected at every predetermined time interval (for example, 5 milliseconds).

A variable lift apparatus 26 is an apparatus that is capable of changing the amount of lift of the intake valve 3 in accordance with a control signal from the ECU 1. The variable lift apparatus 26 can be implemented by any known technique. The variable lift mechanism 26 can be also configured to change the amount of lift of the exhaust valve 5. An example of the lift mechanism 26 used in one embodiment of the invention will be described later referring to FIG. 2.

A signal sent to the ECU 1 is passed to the input interface 1a. The input interface 1a converts an analog signal value into a digital signal value. The CPU 1b processes the resulting digital signal in accordance with a program stored in the memory 1c, and creates a control signal. The output interface 1d sends the control signal to actuators for the fuel injection valve 7, spark plug 9, and other mechanical components.

Figure 2:
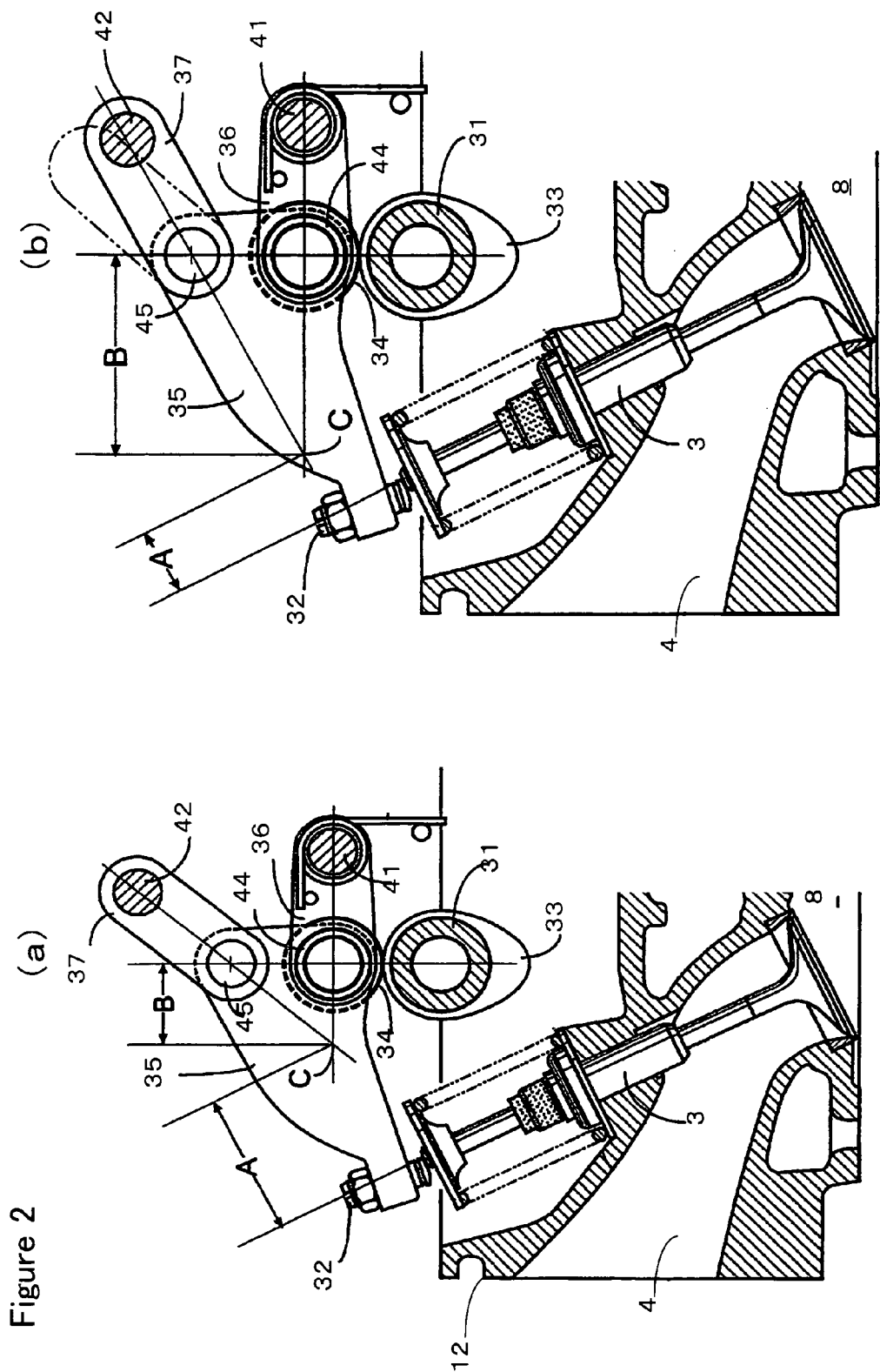
FIG. 2 schematically shows a variable lift mechanism in accordance with one embodiment of the present invention.

FIG. 2 is a variable lift mechanism mounted on the variable lift device 26 in accordance with one embodiment of the present invention. The variable lift mechanism comprises a camshaft 31, a tappet screw 32 and a rocker arm 35. The tappet screw 32 is positioned at an upper end of the intake valve 3 and engaged with one end of the rocker arm 35. The rocker arm 35 has a roller 34 that rotatably contacts a cam 33 provided on the camshaft 31. The roller 34 is rotatably supported by a supporting cylinder 44 having an axis parallel to the camshaft 31. A first link arm 36 and a second link arm 37 are connected to the rocker arm 35.

A supporting shaft 41 that is provided at one end of the first link arm 36 is connected with a cylinder head 12 at a fixed position. A supporting shaft 42 that is provided at one end of the second link arm 37 can be driven steplessly by an actuator (not shown). When the lift amount of the intake valve 3 is set to a maximum value, the supporting shaft 42 of the second link arm 37 is positioned at a position shown in FIG. 2(a). When the lift amount is reduced from the maximum amount, the supporting shaft 42 of the second link arm 37 is moved downward by the actuator as shown in FIG. 2(b).

An instantaneous center C of the rocker arm 35 is an intersection of a straight line connecting the supporting shaft 41 and the supporting cylinder 44 and a straight line connecting the supporting shaft 42 and a connecting shaft 45. When the actuator moves the supporting shaft 42 from the position shown in FIG. 2(a) to the position shown in FIG. 2(b), a lever ratio (=A/B) changes. Here, the lever ratio indicates a ratio of a distance "A" between a contact point of the tappet screw 32 with the intake valve and the instantaneous center C to a distance "B" between a contact point of the roller 34 with the cam 33 and the instantaneous center C. The lever ratio of FIG. 2(b) is smaller than that of FIG. 2(a).

According to such change of the lever ratio, if the roller 34 is pushed up by the cam 33 when the supporting shaft 42 is located at the position shown in FIG. 2(a), the lift amount reaches the maximum. If the roller 34 is pushed up by the cam 33 when the supporting shaft 42 is located at the position shown FIG. 2(b), the lift amount is reduced to, for example, about 20% of the maximum.

Because the position of the supporting shaft 42 can be changed steplessly by the actuator, the lever ratio can be changed steplessly. As a result, the lift amount of the intake valve 3 can be changed steplessly. The actuator receives a modulated signal Ulift_f from the ECU 1 and changes the position of the supporting shaft 42 in accordance with this modulated signal Ulift_f.

Figure 3:
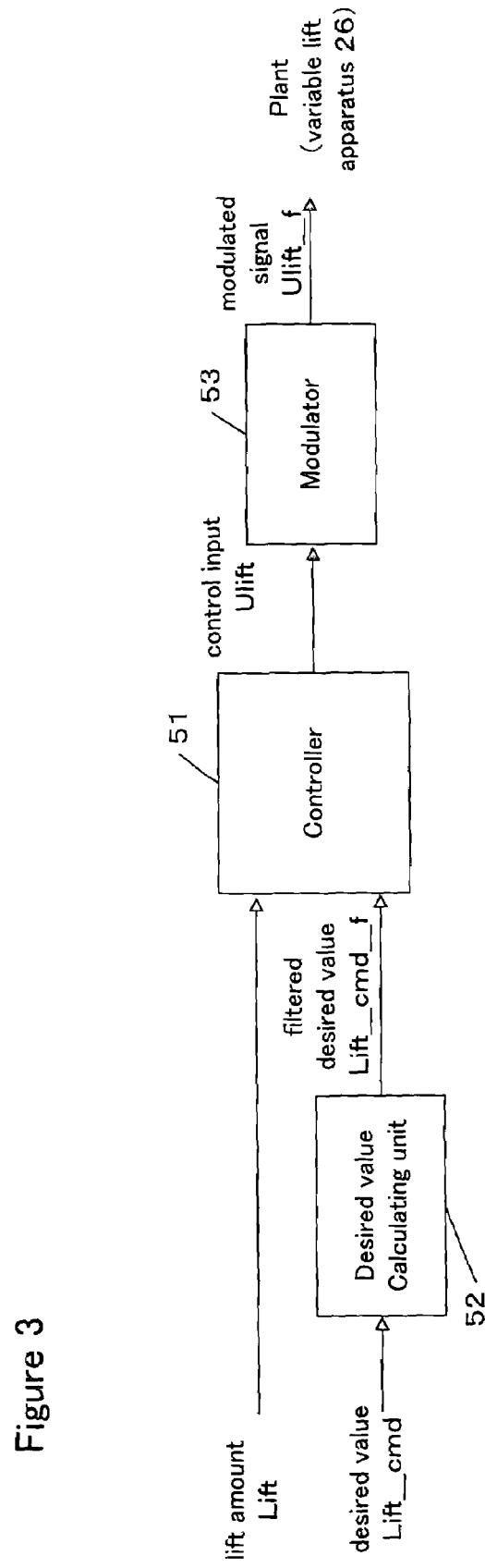
FIG. 3 is a block diagram of a control apparatus in accordance with one embodiment of the present invention.

FIG. 3 is a block diagram of an apparatus for controlling a plant in accordance with one embodiment of the present invention. A controller 51, a desired value calculating unit 52 and a modulator 53 are typically implemented in the ECU 1. In one embodiment, these functions are implemented by one or more computer programs stored in the memory 1c of the ECU 1. Alternatively, these functions may be implemented by hardware, firmware, software or any combination thereof.

In this embodiment, the plant is a variable lift apparatus 26 as shown in FIG. 2. The variable lift apparatus 26 can be modeled as shown by the equation (1). "Lift" is a lift amount (which is a control output) of the intake valve 3 driven by the variable lift apparatus 26. The lift amount is detected by the lift amount sensor 21. "Ulift" is a control input that is calculated by the controller 51. a1, a2, b1 and b2 are model parameters. c1 is an estimated value of disturbance applied to the variable lift apparatus 26. The model parameters and the estimated disturbance value may be predetermined by a simulation or the like. Alternatively, they may be recursively identified. k indicates a control time.

$$\text{Lift}(k+1)=a1\cdot\text{Lift}(k)+a2\cdot\text{Lift}(k-1)+b1\cdot U\text{lift}(k)+b2\cdot U\text{lift}(k-1)+c1 \quad (1)$$

Based on the equation (1), the controller 51 calculates the control input Ulift so as to cause the control output (the actual lift amount Lift) to converge to a desired value Lift_cmd. In this embodiment, the controller 51 calculates the control input by using a 2-degree-of-freedom response assignment control, which is an expanded version of a response assignment control. The response assignment control is a control that is capable of specifying a speed with which an error between the control output and a desired value converges to zero. As an example of the response assignment control, there is a sliding mode control. The 2-degree-of-freedom response assignment control is a control that is capable of separately specifying a speed with which the control output follows a desired value and a speed with which an error between the control output and the desired value converges when disturbance is applied to the plant. The former speed may be referred to as "following speed" and the latter speed may be referred to as "converging speed", hereinafter.

In order to implement the 2-degree-of-freedom response assignment control, a desired value calculating unit 52 is provided. The desired value calculating unit 52 uses a parameter, which specifies the above following speed, to filter the desired value Lift_cmd. This parameter may be referred to as "desired value response assignment parameter". The desired value is determined in accordance with operating conditions of the engine. Thus, the filtered desired value Lift_cmd_f is calculated. The controller 51 calculates the control input Ulift so that the control output Lift follows the filtered desired alue Lift_cmd_f, thereby causing the control output Lift to converge to the desired value Lift_cmd.

A modulator 53 modulates the control input Ulift by using a modulation algorithm. The modulation algorithm transforms the control input Ulift into a modulated signal Ulift_f having switching characteristics. Then, the modulated signal Ulift_f is applied to the variable lift apparatus 26. The modulation algorithm is preferably one of a ΔΣ (delta sigma) modulation algorithm, a ΣΔ (sigma delta) modulation algorithm and a Δ (delta) modulation algorithm. As the lift amount Lift approaches a desired value, variation in the control input Ulift is smaller. Because these algorithms have characteristics that a switching frequency of the modulated signal Ulift_f is higher as variation in the control input Ulift is smaller, the capability that the control output converges to the desired value can be enhanced. Alternatively, another modulation algorithm may be used. For example, a modulation such as PWM can be used.

Alternatively, without providing the modulator 53, the control input Ulift from the controller 51 can be applied to the variable lift apparatus 26.

Now, the equations (101) through (106) show a method that has been conventionally performed by the controller 51 for calculating the control input Ulift, and the equation (107) shows a method that has been conventionally performed by the desired value calculating unit 52 for calculating the filtered desired value Lift_cmd_f.

$$Ulift(k) = Ueq(k) + Urch(k) + Unl(k) \quad (101)$$

$$Ueq(k) = \frac{1}{b1}\{(1 - a1 - POLE)\text{Lift}(k) + (POLE - a2)\text{Lift}(k - 1) + \quad (102)$$
$$\text{Llift\_cmd\_f}(k + 1) - c1 + (POLE - 1)\text{Lift\_cmd\_f}(k) -$$
$$POLE\text{Lift\_cmd\_f}(k - 1) - b2Ulift(k - 1)\}$$

$$Urch(k) = -\frac{Krch}{b1}\sigma(k) \quad (103)$$

$$Unl(k) = -\frac{Knl}{b1}\text{sgn}(\sigma) \quad (104)$$

$$\sigma(k) = Elf(k) + POLE\ Elf(k - 1) \quad (105)$$

$$Elf(k) = \text{Lift}(k) - \text{Lift\_cmd\_f}(k - 1) \quad (106)$$

$$\text{Lift\_cmd\_f}(k) = \quad (107)$$
$$-POLE\_f \cdot \text{Lift\_cmd\_f}(k - 1) + (1 + POLE\_f)\text{Lift\_cmd}(k)$$

The above equations will be described. In order to calculate a filtered desired value Lift_cmd_f, the desired value calculating unit 52 uses a desired value response assignment parameter POLE_f to apply a first-order delay filter (low-pass filter) to the desired value Lift_cmd (equation (107)). As described above, the desired value response assignment parameter POLE_f is a parameter that specifies a speed with which the control output follows the desired value. Preferably, it is set to satisfy −1<POLE_f<0.

Figure 4:
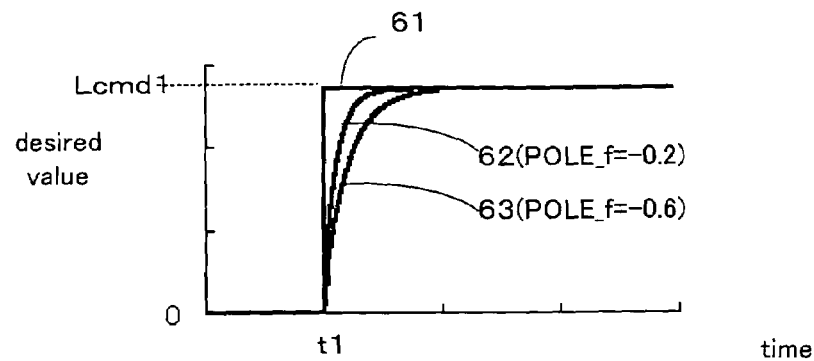
FIG. 4 schematically shows behaviors of a desired value and a filtered desired value.

Referring to FIG. 4, a line 61 indicates a desired value Lift_cmd, a line 62 indicates a filtered desired value Lift_cmd_f calculated by the equation (107) when POLE_f= 0.2, and a line 63 indicates a filtered desired value Lift_cmd_f calculated by the equation (107) when POLE_f=−0.6. As can be seen from FIG. 4, the desired value response assignment parameter POLE_f converts the desired value Lift_cmd into an exponential-function curve that gradually approaches the desired value. As the absolute value of the desired value response assignment parameter POLE_f is smaller, the exponential-function curve more closely approaches the desired value Lift_cmd.

At time t1, the desired values Lift_cmd rapidly increases to Lcmd1. By calculating the control input so that the control output follows a curve as shown by the line 62 or 63, the control output can reach the desired value Lcmd1 more smoothly.

The control output reaches the desired value Lcmd1 more quickly by letting the control output follow the line 62 than by letting the control output follow the line 63. Thus, the time required for the control output to reach the desired value changes depending on the value of the desired value response assignment parameter POLE_f.

The controller 51 calculates the control input Ulift so that the control output follows the filtered desired value Lift_cmd_f. This calculation will be described.

The controller 51 defines a switching function σ (equation (105)). Elf is an error between the actual lift amount Lift and the filtered desired value Lift_cmd_f (equation (106)). The switching function σ specifies a convergence behavior of the error Elf. POLE is a parameter for specifying a speed with which the error Elf converges when disturbance is applied. Preferably, POLE is set to satisfy −1<POLE<0.

Now, the switching function σ and the parameter POLE will be described. In the 2-degree-of-freedom response assignment control, the control input Ulift is determined so that the switching function τ reaches zero.

$$\sigma(k) = 0 \quad (108)$$
$$\Downarrow$$
$$Elf(k) = -POLE \cdot Elf(k - 1)$$

The equation (108) represents a first-order delay system having no input. That is, the 2-degree-of-freedom response assignment control controls the error Elf so that the error Elf is confined within the first-order delay system shown in the equation (108).

Figure 5:
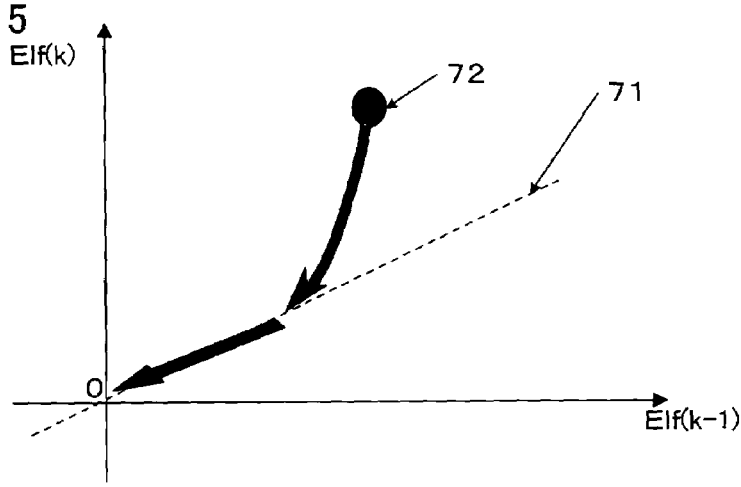
FIG. 5 schematically shows a convergence of a state quantity of a plant in a response assignment control in accordance with one embodiment of the present invention.
Figure 6:
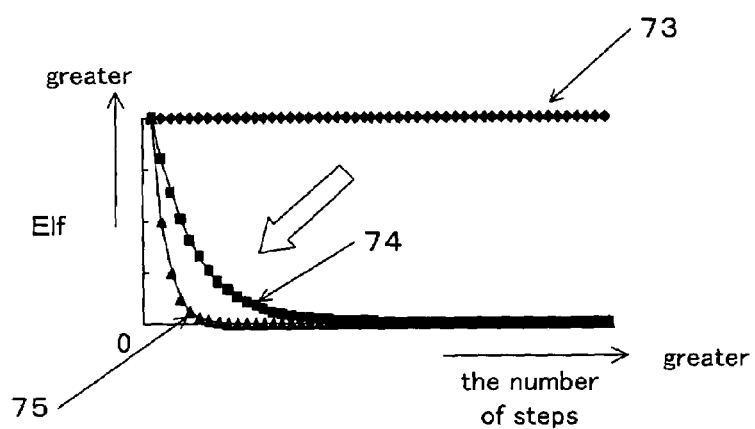
FIG. 6 schematically shows a convergence speed according to a response assignment parameter for disturbance in accordance with one embodiment of the present invention.

FIG. 5(a) is a phase plane with Elf(k) on the vertical axis and Elf(k−1) on the horizontal axis. A switching straight line 71 expressed by the equation (108) is shown in the phase plane. Assuming that a point 72 is an initial value of a state quantity (Elf(k−1), Elf(k)), the 2-degree-of-freedom response assignment control places the state quantity on the switching line 71 and then confines it on the switching line 71. Thus, the state quantity automatically converges to the origin (that is, Elf(k), Elf(k−1)=0) of the phase plane with time because the state quantity is confined within the first-order delay system having no input. By confining the state quantity on the switching line 71, the state quantity can converge to the origin without being influenced by disturbance.

Referring to FIG. 5(b), reference numerals 73, 74 and 75 show the converging speed of the error Elf when the disturbance response assignment parameter POLE takes a value of −1, −0.8 or −0.5, respectively. The converging speed of the error Elf increases as the absolute value of the response assignment parameter POLE decreases.

An equivalent control input Ueq represented by the equation (102) acts to confine the state quantity of the plant on the switching line. Therefore, the equation (109) needs to be satisfied.

$$\sigma(k+1)=\sigma(k) \quad (109)$$

Based on the equation (109) and the model expression (1), the equivalent control input Ueq is determined as shown by the equation (102)

Furthermore, the controller 51 calculates a reaching law input Urch (equation (103)). The reaching law input Urch is an input for placing the state quantity on the switching line 71. Krch represents a gain. The controller 51 further calculates a nonlinear input Unl (equation (104)). The nonlinear input Unl is an input for vibrationally (with reciprocating behavior) confining the state quantity near the switching line 71. Knl represents a gain. The values of the gains Krch and Knl are predetermined by a simulation or the like, taking into account the stability, quick responsiveness etc. of the control output.

The controller 51 calculates a sum of the equivalent control input Ueq, the reaching law input Urch and the nonlinear input Unl as the control input Ulift (equation (101)).

Alternatively, in an embodiment where a one-degree-of-freedom response assignment control is performed by the controller 51, filtering of the desired value by the desired value calculating unit 52 is not required. The controller 51 calculates the control input Ulift so that the control output follows the desired value Lift_cmd. In this case, the equation (107) is not processed and the filtered desired value LIft_cmd_f included in the other equations is replaced with the desired value Lift_cmd.

Figure 19:
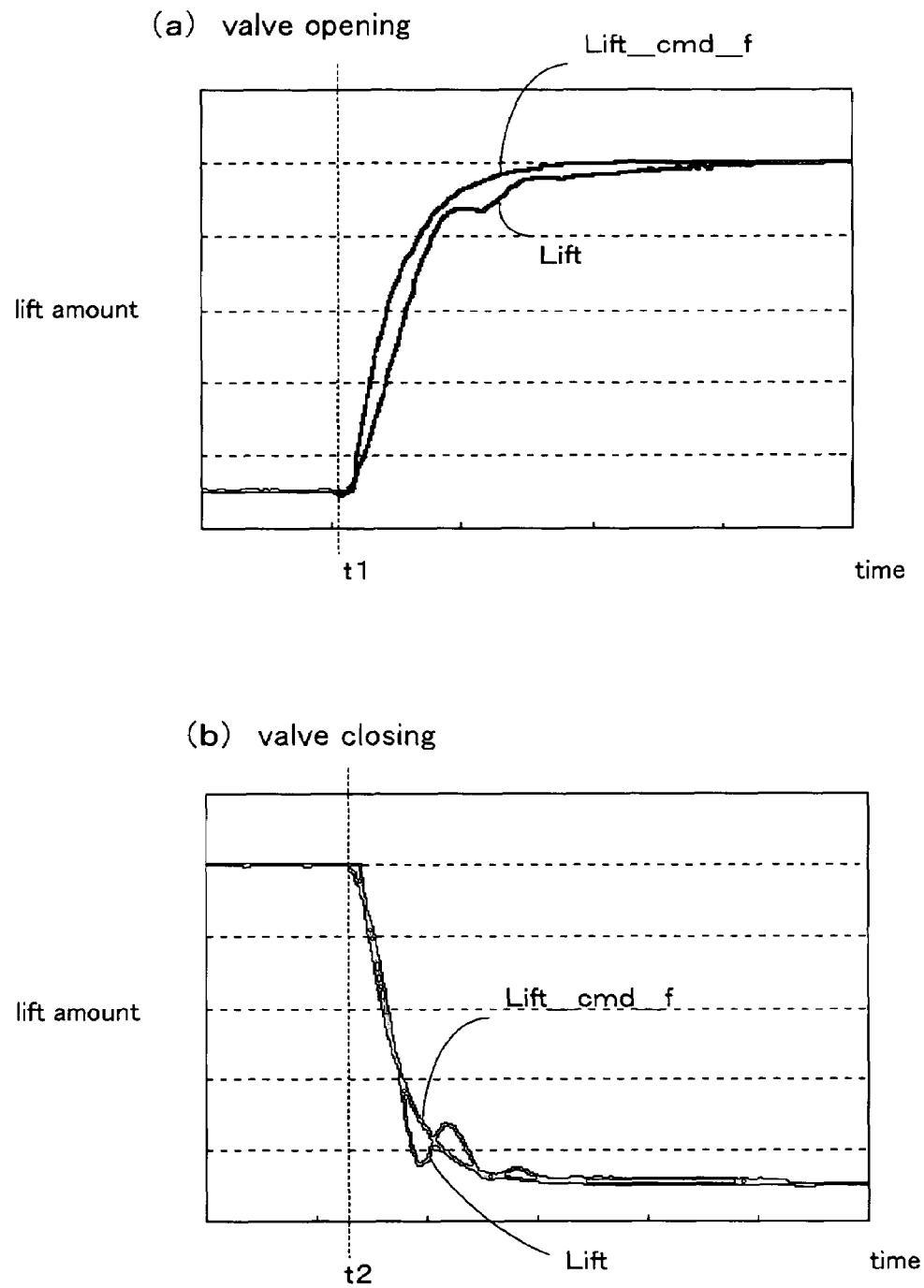
FIG. 19 schematically shows a delay with which a control output follows a desired value and overshooting of the control output in a conventional valve control.

If the control input Ulift is calculated according to the above conventional scheme, the control output may lags behind the desired value and the control output may overshoot the desired value, due to the nonlinear characteristics or the like of the plant, as described above referring to FIG. 19.

The present invention provides a technique for efficiently suppressing such delay and overshooting.

Behavior of the control output is based on the control input and the desired value. Therefore, the delay and the overshooting of the control output can be suppressed by adjusting the behavior of the control input and/or the behavior of the desired value. For example, a delay as described above referring to FIG. 19(*a*) occurs because the control output cannot catch up with change of the desired value. Therefore, the delay can be suppressed by accelerating a speed of change of the control output through adjustment of the behavior of the control input and/or the desired value.

Overshooting as described above referring to FIG. 19(*b*) occurs because the control output gets ahead of the desired value. Therefore, the overshooting can be suppressed by decelerating a speed of change of the control output through adjustment of the behavior of the control input and/or the desired value.

According to the present invention, a parameter is defined so as to adjust a speed of change of the control output relative to change of the desired value. The behavior of the control output can be easily adjusted by the parameter. Through such adjustment, the delay and overshooting of the control output can be effectively suppressed.

A first parameter is acts to change a speed of change of the control output by changing a speed of change of the control input. A second parameter acts to change a speed of change of the control output through a corrected desired value. The second parameter can further include two parameters (a gradient parameter and a gradually-approaching characteristic parameter).

These parameters will be described.

First Parameter

Figure 7:
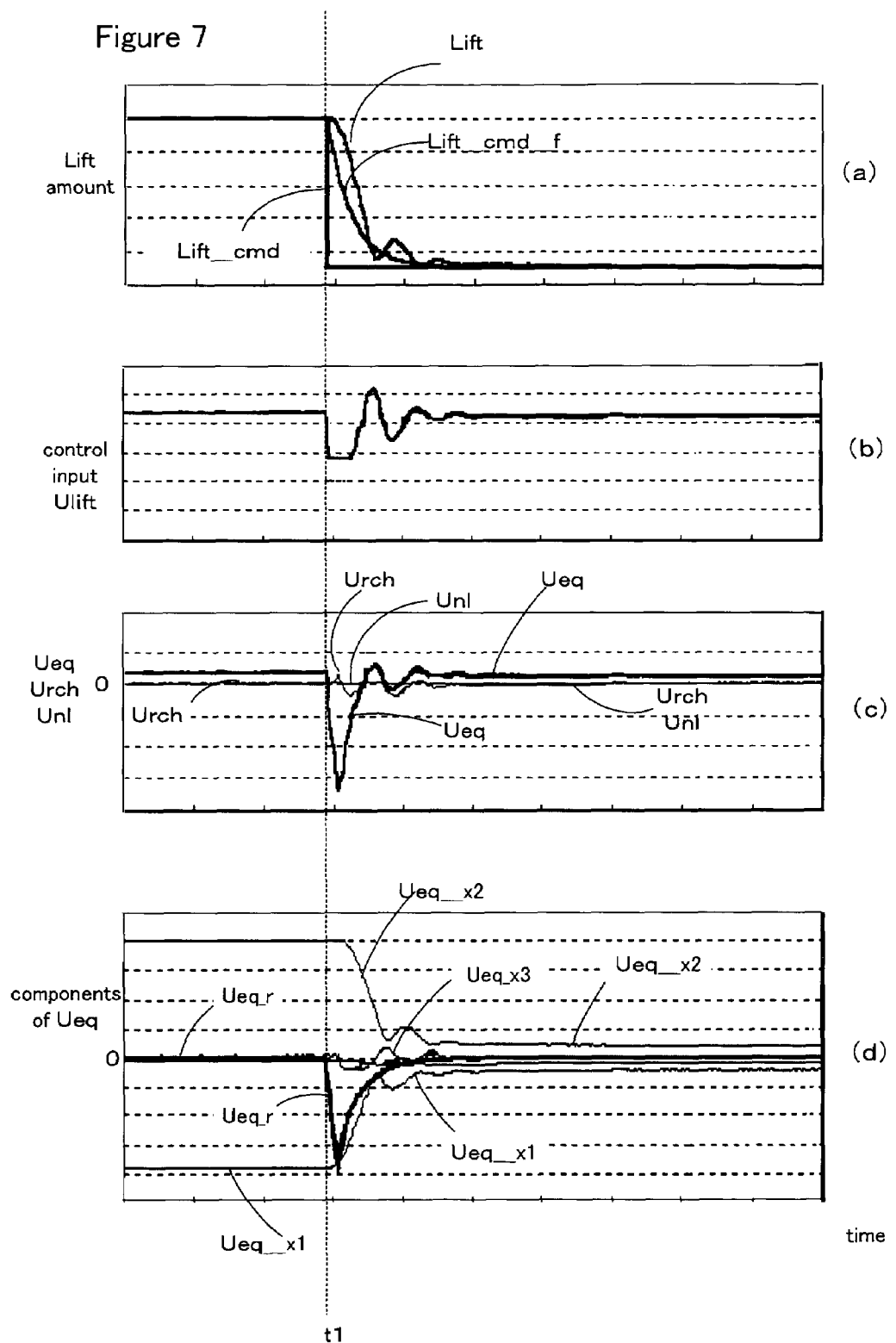
FIG. 7 schematically shows behaviors of a control output, a control input, an equivalent control input and components of the equivalent control input when a desired value changes.

As described above, in this embodiment, the control input Ulift includes the equivalent control input Ueq, the reaching law input Urch and the nonlinear input Unl. Behavior of the control input Ulift is shown in FIG. 7(*b*) when the filtered desired value Lift_cmd_f changes in response to a change of the desired value Lift_cmd at time t1 as shown in FIG. 7(*a*). FIG. 7(*a*) also shows the control output Lift when a signal Ulift_f modulated based on the control input Ulift is applied to the plant.

Referring to FIG. 7(*c*), behaviors of the equivalent control input Ueq, the reaching law input Urch and the nonlinear input Unl are shown. It is seen that the behavior of the equivalent control input Ueq is similar to that of the control input Ulift. The reaching law input Urch slightly changes in response to a change of the desired value at time t1. The nonlinear input Unl exhibits almost no change even when the desired value changes. The input Unl remains around zero.

As can be seen from comparison between FIGS. 7(*b*) and 7(*c*), the behavior of the control input Ulift mainly depends on (dominated by) the equivalent control input Ueq. Referring back to the equation (102) for calculating the equivalent control input Ueq, the input Ueq can be decomposed as shown by the equation (2).

$$Ueq(k) = \frac{1}{b1}\{(1 - a1 - POLE)\text{Lift}(k) + (POLE - a2)\text{Lift}(k-1) + \quad (2)$$
$$\text{Llift\_cmd\_f}(k+1) - c1 + (POLE - 1)\text{Lift\_cmd\_f}(k) -$$
$$POLE\ \text{Lift\_cmd\_f}(k-1) - b2Ulift(k-1)\} =$$
$$\text{Ueq\_x1}(k) + \text{Ueq\_x2}(k) + \text{Ueq\_x3}(k) + \text{Ueq\_delta}(k) + \text{Ueq\_r}(k)$$

$$\text{Ueq\_x1}(k) = \frac{1}{b1}(1 - a1 - POLE)\text{Lift}(k) \quad (11)$$

$$\text{Ueq\_x2}(k) = \frac{1}{b1}(POLE - a2)\text{Lift}(k-1) \quad (12)$$

$$\text{Ueq\_x3}(k) = -\frac{b2}{b1}Ulift(k-1) \quad (13)$$

$$\text{Ueq\_delta}(k) = -\frac{c1}{b1} \quad (14)$$

$$\text{Ueq\_r}(k) = \frac{1}{b1}\{\text{Llift\_cmd\_f}(k+1) + \quad (15)$$
$$(POLE - 1)\text{Lift\_cmd\_f}(k) - POLE\ \text{Lift\_cmd\_f}(k-1)\}$$

Referring to FIG. 7(*d*), behaviors of the components obtained by decomposing the equivalent control input Ueq are shown. It is seen that the behaviors of the first component Ueq_x1 and the second component Ueq_x2 are symmetric with respect to the zero line. The behavior of the second component Ueq_x2 is similar to that of the filtered desired value Lift_cmd_f. The third component Ueq_x3 slightly changes in response to a change of the desired value. Its behavior is similar to that of the reaching law input Urch. The fourth component Ueq_delta moves almost along the zero line. Its behavior is similar to that of the nonlinear input Unl. The fifth component Ueq_r exhibits a similar behavior to the equivalent control input Ueq.

As can be seen from comparison between each of the behaviors of the first to fifth components shown in FIG. 7(d) and the behavior of the equivalent control input Ueq shown in FIG. 7(b), the behavior of the equivalent control input Ueq mainly depends on the fifth component Ueq_r. Thus, the behavior of the equivalent control input Ueq when the desired value changes mainly depends on the fifth component Ueq_r. The fifth component Ueq_r is a feed-forward term to be calculated based on the filtered desired value Lift_cmd_f as shown by the equation (15). Differently from the first to fourth components, this feed-forward term can be calculated independently of occurrence of the error Elf. Therefore, the fifth component Ueq_r most quickly responds to a change of the desired value and provides the most influence on the behavior of the control output Lift when the desired value changes.

In one embodiment of the present invention, the fifth component Ueq_r is assigned a weight. By adjusting the weight, a speed of change of the equivalent control input Ueq can be adjusted. Resultantly, a speed of change of the control input Ulift can be adjusted. This weight is represented by Keq_r, which is referred to as an adjustment gain. This corresponds to the above-described first parameter.

The equation (16) calculates the equivalent control input Ueq based on the adjustment gain Keq_r. The adjustment gain Keq_r is a positive value larger than zero.

$$Ueq(k) = \frac{1}{b1}[(1 - a1 - POLE)\text{Lift}(k) + (POLE - a2)\text{Lift}(k-1) + \\ Keq\_r\{L\text{lift\_cmd\_f}(k+1) + (POLE - 1)\text{Lift\_cmd\_f}(k) - \\ POLE \text{ Lift\_cmd\_f}(k-1)\} - b2 \text{ } Ulift(k-1) - c1] \quad (16)$$

In the case where the adjustment gain Keq_r=1, the equation (16) becomes equivalent to the conventional equation (102). When the adjustment gain Keq_r is set to a value larger than 1, a speed of change of the equivalent control input Ueq relative to change of the filtered desired value Lift_cmd_f becomes faster as compared to the conventional equation (102), thereby accelerating a speed of change of the control output. In order to improve the capability that the control output follows the filtered desired value, the value of the adjustment gain Keq_r is increased (for example, Keq_r>1). When the adjustment gain Keq_r is set to a value smaller than 1, a speed of change of the equivalent control input Ueq relative to change of the filtered desired value Lift_cmd_f becomes slower as compared to the conventional equation (102), thereby slowing a speed of change of the control output. In order to suppress the overshooting, the value of the adjustment gain Keq_r is decreased (for example, Keq_r<1).

The controller 51 calculates the control input Ulift by using the equivalent control input Ueq calculated according to the equation (16) in place of the equation (102).

Figure 8:
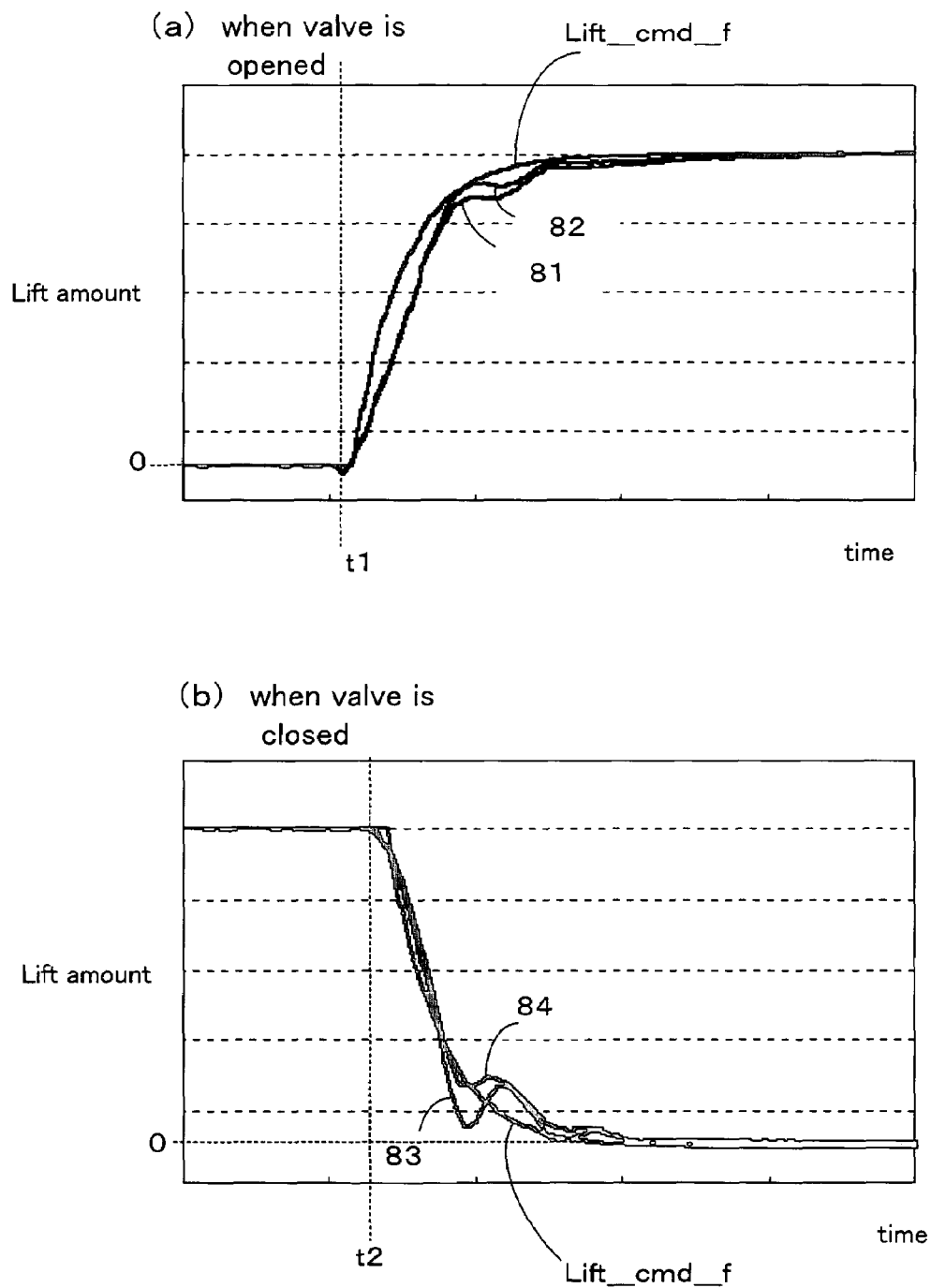
FIG. 8 schematically shows a result of a control in which an adjustment gain is used in accordance with one embodiment of the present invention.

FIG. 8 is a control result when the adjustment gain Keq_r is used. Referring to FIG. 8(a), a line representing the filtered desired value Lift_cmd_f and a line 81 representing the actual lift amount Lift are shown. These lines are the same as shown in FIG. 19(a). The line 81 shows a case where although the equivalent control input Ueq calculated in accordance with the conventional equation (102) is used, the adjustment gain Keq_r is not substantially used (that is, Keq_r=1). A line 82 shows the lift amount Lift when the equivalent control input Ueq is calculated according to the equation (16) using the adjustment gain Keq_r. In order to improve the capability that the control output follows the filtered desired value, the adjustment gain Keq_r is set to a value larger than 1 (for example, 1.1). Referring to the line 82, a rising speed at the time (t1) when the filtered desired value Lift_cmd_f changes is faster than the line 81. In other words, the capability that the lift amount follows the filtered desired value is improved. Thus, when the valve is opened, the capability that the lift amount follows the filtered desired value can be improved by increasing the adjustment gain Keq_r.

Referring to FIG. 8(b), a line representing the filtered desired value Lift_cmd_f and a line 83 representing the actual lift amount Lift are shown. These lines are the same as shown in FIG. 19(b). The line 83 shows a case where although the equivalent control input Ueq calculated in accordance with the conventional equation (102) is used, the adjustment gain Keq_r is not substantially used (that is, Keq_r=1). A line 84 shows the lift amount Lift when the equivalent control input Ueq is calculated according to the equation (16) using the adjustment gain Keq_r. In order to suppress the overshooting of the lift amount, the adjustment gain Keq_r is set to a value smaller than 1 (for example, 0.7). Referring to the line 84, a falling speed at the time (t2) when the filtered desired value Lift_cmd_f changes is slower than the line 83 (in this example, the overshooting amount decreases by about 40% as compared to the line 83). Thus, when the valve is closed, the overshooting of the lift amount can be suppressed by decreasing the adjustment gain Keq_r.

As described above, in an embodiment where a one-degree-of-freedom response assignment control is performed by the controller 51, filtering of the desired value by the desired value calculating unit 52 is not required. In this case, the controller 51 calculates the control input Ulift so that the control output Lift follows the desired value Lift_cmd. According to the above described method, a speed of change of the control output Lift relative to change of the desired value Lift_cmd can be adjusted by the adjustment gain Keq_r.

Second Parameter

The second parameter will be described. The second parameter is a parameter that is capable of changing a speed of change of the control output relative to change of the desired value through a corrected desired value. The second parameter can include a gradient parameter and a gradually-approaching characteristic parameter.

Figure 9:
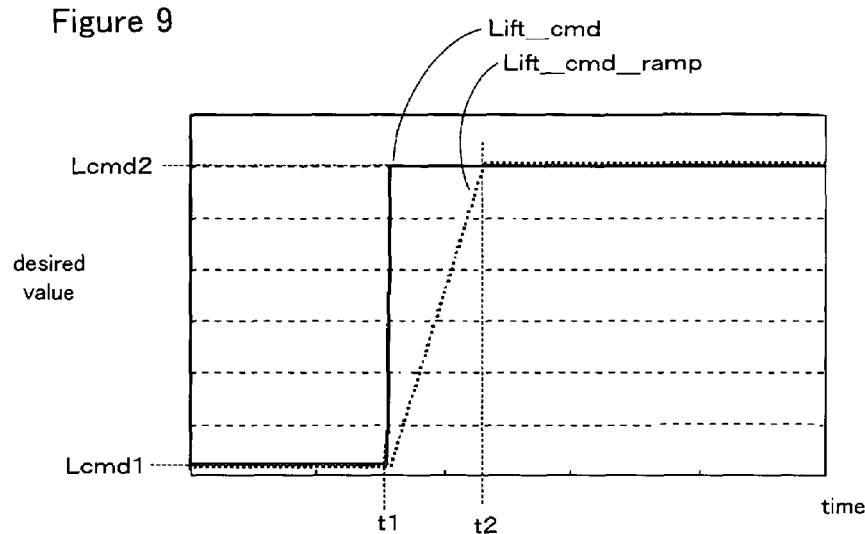
FIG. 9 schematically shows a ramp signal relative to a desired value in accordance with one embodiment of the present invention.

The gradient parameter will be described. Referring to FIG. 9, the desired value Lift_cmd changes abruptly from Lcmd1 to Lcmd2 at time t1. A ramp signal Lift_cmd_ramp generated from the desired value Lift_cmd is shown. The ramp signal Lift_cmd_ramp reaches Lcmd2 at time t2. Clearly, a speed of change of the ramp signal Lift_cmd_ramp is slower than a speed of change of the desired value Lift_cmd. By calculating the control input Ulift so that the control output follows the ramp signal Lift_cmd_ramp, the speed of change of the control output Lift relative to change of the desired value Lift_cmd can be slowed down as compared to the case where the control input Ulift is calculated so that the control output follows the desired value. This relative speed is determined in accordance with the gradient of the ramp signal. A parameter representing the gradient corresponds to the above-described gradient parameter.

The desired value calculating unit 52 generates the ramp signal Lift_cmd_ramp in accordance with the equations (17)

through (20). Here, the gradient parameter is represented by "Lrate", which has a positive value larger than zero. "k" indicates a control time.

$$m(k) = \text{Lift\_cmd}(k) - \text{Lift\_cmd\_ramp}(k - 1) \quad (17)$$
$$\text{Lift\_cmd\_ramp}(k) = p(k) + \text{Lift\_cmd\_ramp}(k - 1) \quad (18)$$
$$\begin{cases} |m(k)| \le \text{Lrate} & p(k) = m(k) \quad (19) \\ |m(k)| > \text{Lrate} & p(k) = \text{Lrate} \cdot \text{sig}(m(k)) \quad (20) \end{cases}$$

The above equations will be described. The equation (18) generates the ramp signal Lift_cmd_ramp. p(k) in the equation (18) is calculated by the equation (19) or (20). m(k) indicates a difference between the current value of the desired value Lift_cmd and the previous value of the ramp signal Lift_cmd_ramp, as shown in the equation (17). When this difference is equal to or smaller than the gradient parameter Lrate, this difference is substituted into p(k). When the difference is larger than the gradient parameter Lrate, the value of the gradient parameter Lrate is substituted into p(k). sig( ) is a sign function. When the difference is a positive value, +Lrate is substituted into p(k). When the difference is a negative value, −Lrate is substituted into p(k).

Figure 10:
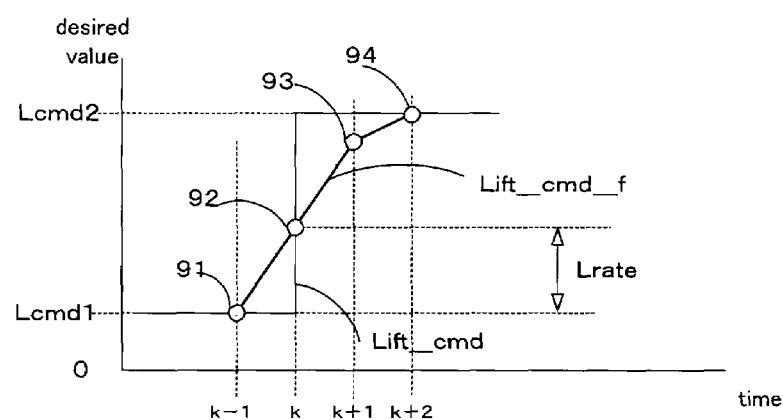
FIG. 10 schematically shows how to generate a ramp signal in accordance with one embodiment of the present invention.

Now, a method for generating the ramp signal will be specifically described referring to FIG. 10. It is assumed that the desired value Lift_cmd takes a value of Lcmd1 at a control time (k−1) and the desired value changes to Lcmd2 at time k. It is also assumed that a value of the ramp signal Lift_cmd_ramp at a control time (k−1) is Lcmd1 (see a point 91). At the time k, m is determined by subtracting Lcmd1 from Lcmd2 (equation 17). This difference is represented by Δcmd1. In this example, +Lrate is set in p because Δcmd1 is larger than the value of the gradient parameter Lrate. According to the equation (18), the ramp signal at the control time k has a value of (Lcmd1+Lrate) (see a point 92).

The value of the ramp signal at the time k is (Lcmd1+Lrate), and the desired value Lift_cmd is kept at Lcmd2 during a period from the time k to k+1. m at the time k+1 is determined by subtracting (Lcmd1+Lrate) from Lcmd2. Since the resultant value is larger than the gradient parameter Lrate, +Lrate is set in p(k). According to the equation (18), the ramp signal at the time k+1 has a value of (Lcmd1+2×Lrate) (see a point 93). The value of the ramp signal at the time k+1 is (Lcmd1+2×Lrate), and the desired value Lift_cmd is kept at Lcmd2 during a period from k+1 to k+2. m at the time k+2 is determined by subtracting (Lcmd1+2×Lrate) from Lcmd2. Since the resultant value is smaller than Lrate, m (that is, Lcmd2−Lcmd1−2×Lrate) is set in p. According to the equation (18), the ramp signal at the time k+2 has a value of Lcmd2 (see a point 94).

As the value of the gradient parameter Lrate decreases, the speed of change of the control output Lift relative to change of the desired value Lift_cmd is slower. In order to improve the capability that the control output follows the desired value, the value of the gradient parameter Lrate is increased so as to accelerate the relative speed. In order to suppress the overshooting, the value of the gradient parameter Lrate is decreased so as to decelerate the relative speed.

In one embodiment, the desired value calculating unit 52 does not carry out the above-described filtering process. Therefore, the ramp signal Lift_cmd_ramp is used as the above-described "corrected desired value". The controller 51 calculates the control input Ulift so that the control output follows this corrected desired value. Lift_cmd_f in the equations (101) through (106) is replaced with Lift_cmd_ramp.

In another embodiment, the desired value calculating unit 52 calculates the filtered desired value Lift_cmd_f based on the ramp signal Lift_cmd_ramp as shown by the equation (21). The filtered desired value that is calculated based on the ramp signal is used as the above-described "corrected desired value".

$$\text{Lift\_cmd\_}f(k) = -\text{POLE\_}f \cdot \text{Lift\_cmd\_}f(k-1) + (1+(21)$$

Figure 11:
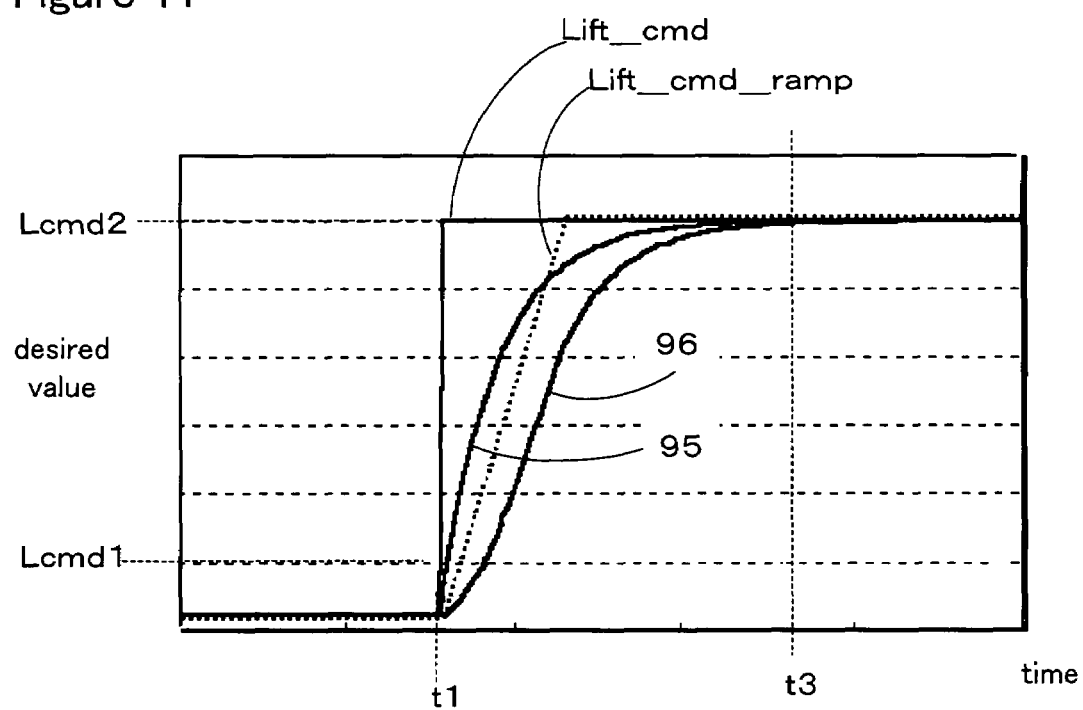
FIG. 11 schematically shows a behavior of a filtered desired value that is generated based on a ramp signal in accordance with one embodiment of the present invention.

Referring to FIG. 11, a line 95 indicates the filtered desired value Lift_cmd_f calculated based on the desired value Lift_cmd according to the equation (107) and a line 96 indicates the filtered desired value Lift_cmd_f calculated based on the ramp signal Lift_cmd_ramp according to the equation (21).

By performing the filtering based on the ramp signal, the ramp signal Lift_cmd_ramp is transformed into an exponential-function curve 96 having the gradually-approaching characteristics relative to a change of the ramp signal Lift_cmd_ramp. As described above, as the absolute value of the desired value response assignment parameter POLE_f is smaller, the control output more closely approaches the ramp signal Lift_cmd_ramp.

It can be seen that when the desired value Lift_cmd changes from Lcmd1 to Lcmd2 at time t1, the rising speed of the filtered desired value Lift_cmd_f shown by the line 96 is more moderate than that of the filtered desired value Lift_cmd_f shown by the line 95. Thus, by filtering the ramp signal Lift_cmd_ramp, the filtered desired value Lift_cmd_f having a more moderate rising speed can be generated. As the gradient parameter Lrate is set to a smaller value, a response of the control output when the desired value changes is more moderate.

The controller 51 calculates the control input Ulift in accordance with the equations (101) through (106) by using the filtered desired value Lift_cmd_f thus generated based on the ramp signal.

Next, the gradually-approaching characteristic parameter will be described. The above-described desired value response parameter POLE_f is used as the gradually-approaching characteristic parameter. As described above referring to FIG. 4, according to the desired value response parameter POLE_f, change of the desired value Lift_cmd is transformed into an exponential-function curve having gradually-approaching characteristics relative to change of the desired value Lift_cmd. Clearly from FIG. 4, the speed of change of the filtered desired value shown by the lines 62 and 63 is slower than that of the desired value Lift_cmd shown by the line 61. By calculating the control input Ulift so that the control output follows the filtered desired value Lift_cmd_f, a speed of change of the control output relative to change of the desired value Lift_cmd can be slowed down as compared to the case where the control input is calculated so that the control output follows the desired value Lift_cmd.

As the absolute value of the desired value response parameter POLE_f is smaller, the gradually-approaching capability is enhanced and hence the speed of change of the filtered desired value Lift_cmd_f is faster. Therefore, in order to improve the capability that the control output follows the desired value, the absolute value of the gradually-approaching characteristic parameter POLE_f is decreased so as to accelerate the relative speed. In order to suppress the overshooting, the absolute value of the gradually-approaching characteristic parameter POLE_f is increased so as to decelerate the relative speed.

Conventionally, the desired value response parameter POLE_f is predetermined and fixed so that the speed with which the control output follows the desired value can be maintained at a high value. However, when the desired value response parameter POLE_f is fixed to such a high value, overshooting may occur due to too fast speed depending on the plant condition. Therefore, in the present invention, the desired value response parameter POLE_f is determined in accordance with the plant condition. In this specification, the desired value response parameter POLE_f, the value of which is changed in accordance with the plant condition, is referred to as the gradually-approaching characteristic parameter. The filtered desired value Lift_cmd_f calculated by using the gradually-approaching characteristic parameter corresponds to the above described "corrected desired value".

The desired value calculating unit 52 carries out the equations (22) through (25) to switch the value of the gradually-approaching characteristic parameter POLE_f in accordance with the plant condition.

$$\text{when } v(k) \leq dClose \text{ and } r(k) < 0,$$
$$POLE\_f = POLE\_f\_low \quad (22)$$

$$\text{otherwise } POLE\_f = POLE\_f\_high \quad (23)$$

$$\text{where } v(k) = Lift\_cmd(k) - Lift\_cmd(k-1) \quad (24)$$

$$r(k) = v(k) + Jr \cdot r(k-1) \quad (25)$$

If a condition specified in the equation (26) is satisfied, the desired value calculating unit 52 returns the gradually-approaching characteristic parameter POLE_f to POLE_f_high that is a default value. Kr is a reset condition value that is predetermined.

$$|r(k)| \leq Kr \quad (26)$$

The equation (25) applies a first-order delay filter to a change v of the desired value Lift_cmd. Jr indicates a predetermined decision parameter. The change of the desired value is completed in an instant (referring to an example of FIG. 12, the desired value changes from zero to Lcmd1 at time t1). If the value of the gradually-approaching characteristic parameter is switched based on such an abrupt change, a time period during which the gradually-approaching characteristic parameter after the switching is reflected in the control input Ulift may be too short. Therefore, in order to continue the condition required for switching the value of the gradually-approaching characteristic parameter, a first-order delay filter is used to transform the momentary change of the desired value into a continuous change. If r(k) thus calculated has a positive value, it indicates that the valve is now being opened. If r(k) has a negative value, it indicates that the valve is now being closed.

POLE_f_high, which is a default value, has been set to a value (for example, 0.8) for keeping the speed with which the control output follows the desired value at a high speed. As shown by the equation (23), the value of the gradually-approaching characteristic parameter is set to this default value except for the conditions where there is a possibility that overshooting occurs due to such a fast speed.

The equation (22) shows one example of a condition where there is a possibility that overshooting occurs. dClose is a predetermined value having a negative value. A change of the lift amount when the valve is being closed is represented by a negative value. A condition where r(k)<0 and v(k)≦dClose indicates that the valve is now being closed and the absolute amount of change of the desired value (per one control cycle) is larger than the absolute value of dClose. When the valve is being closed at a speed higher than a predetermined speed, overshooting may occur by action of the above-described return spring. Therefore, the gradually-approaching characteristic parameter POLE_f is set to POLE_f_low so as to decrease the speed with which the control output follows the desired value. Here, as described above, as the absolute value of POLE_f is smaller, the speed is faster. Therefore, (the absolute value of POLE_f_high)< (the absolute value of POLE_f_low) is met.

Figure 12:
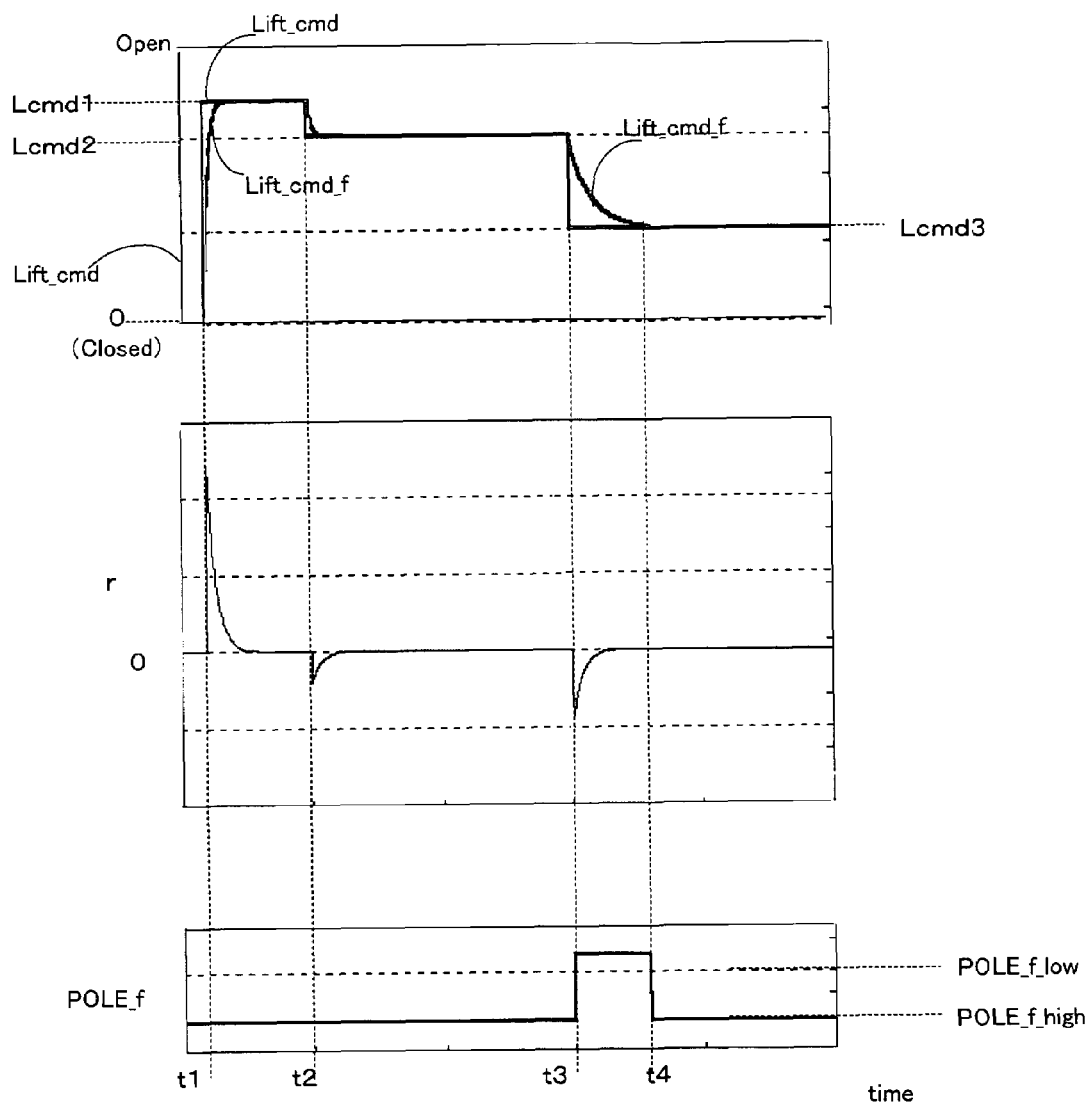
FIG. 12 schematically shows how to switch a gradually-approaching characteristic parameter in accordance with one embodiment of the present invention.

Referring to FIG. 12, an example of operation implemented by the above-described equations will be described. At time t1, the desired value Lift_cmd of the lift amount changes from zero to Lcmd1. This indicates that the valve is moved toward the opened position. Since change of the lift amount is a positive value, r(k) has a positive value. The gradually-approaching characteristic parameter POLE_f is set to POLE_f_high according to the equation (23). Thus, the speed with which the control output follows the desired value is kept at a high value.

At time t2, the desired value Lift_cmd changes from Lcmd1 to Lcmd2. This indicates that the valve is moved toward the closed position. Since change of the lift amount is a negative value, r(k) has a negative value. Since the absolute amount of the change v of the desired value is smaller than the absolute value of dClose, the gradually-approaching characteristic parameter POLE_f is set to POLE_f high according to the equation (23). Even when the valve is being closed, the speed of change of the control output as long as the amount of change of the lift amount is small and hence overshooting is not likely to occur. Therefore, the value of the gradually-approaching characteristic parameter is set to Pole_f_high so as to avoid a delay with which the control output follows the desired value.

At time t3, the desired value changes from Lcmd2 to Lcmd3. This indicates that the valve is moved toward the closed position. Since change of the lift amount is a negative value, r(k) has a negative value. Since the absolute amount of the change v of the desired value is larger than the absolute value of dClose, the gradually-approaching characteristic parameter POLE_f is set to POLE_f_low according to the equation (22). Thus, when the valve is being closed at a speed higher than a predetermined speed, the speed with which the control output follows the desired value is slowed down because overshooting is likely to occur in such a situation.

If the absolute value of the signal r is equal to or smaller than the reset condition value Kr in accordance with the equation (26) after the gradually-approaching characteristic parameter POLE_f is set to POLE_f_low, the gradually-approaching characteristic parameter POLE_f is reset to POLE_f_high (at time t4). Thus, only when the plant is in a condition where overshooting is likely to occur, the value of the gradually-approaching characteristic parameter POLE_f is changed so that the speed with which the control output follows the desired value is slow. If the plant exits from such a condition, the value of the gradually-approaching characteristic parameter POLE_f is reset so that the speed is kept at a high value.

Figure 13:
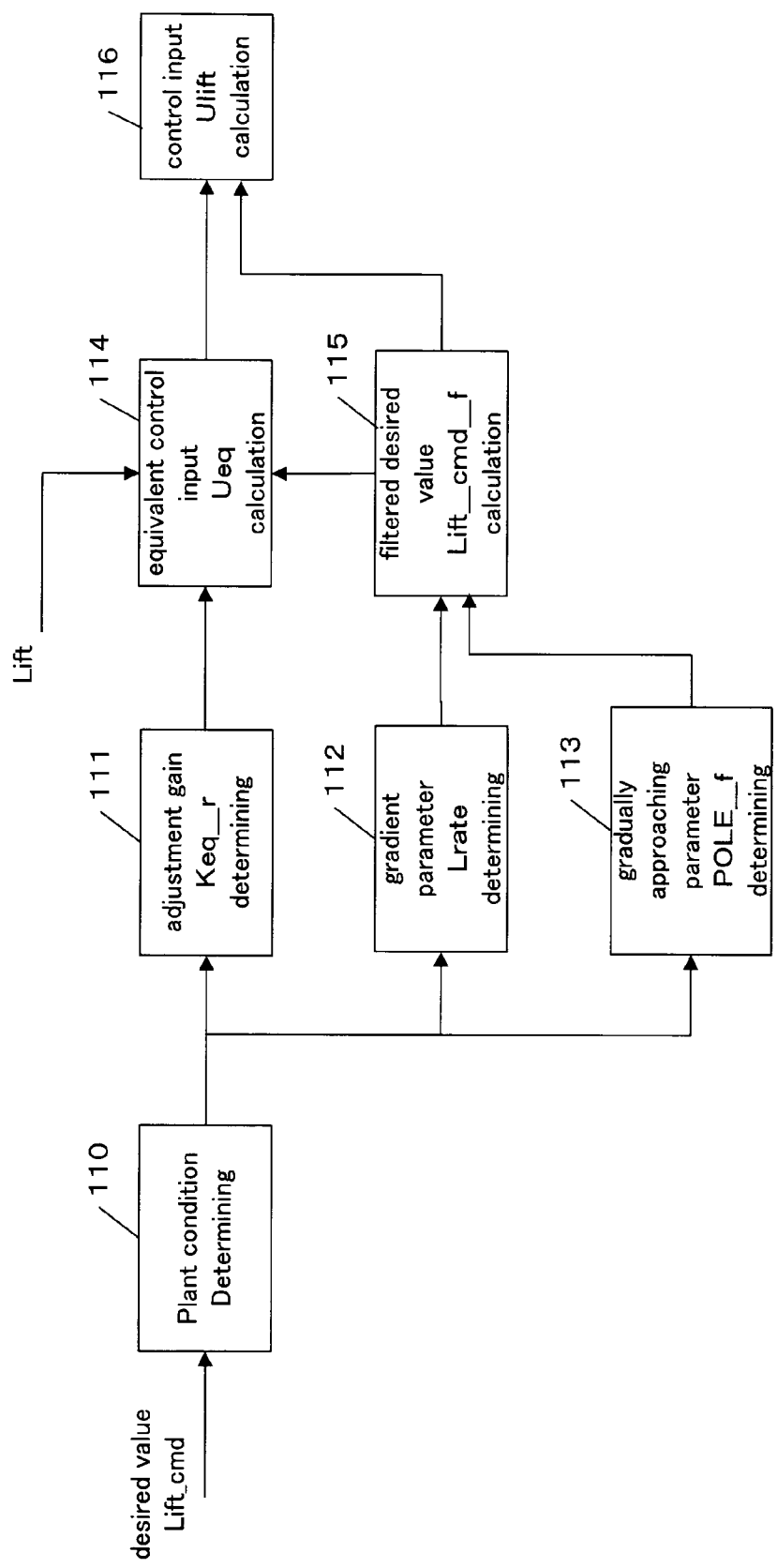
FIG. 13 shows a detailed functional block diagram of a controller and a desired value calculating unit in accordance with one embodiment of the present invention.

FIG. 13 shows a detailed functional block diagram of the controller 51 and the desired value calculating unit 52 (FIG. 3) in accordance with one embodiment of the present invention. These functions are typically implemented in the ECU 1 as described above referring to FIG. 3.

A plant condition determining unit 110 determines a condition of the plant (variable lift apparatus 26 in this embodiment). In this embodiment, the unit 110 determines whether the intake valve (or the exhaust valve) is now being closed or opened based on the desired value Lift_cmd. The unit 110 further calculates the amount of change per unit time (speed of change) of the desired value Lift_cmd.

An adjustment gain determining unit 111 determines a value of the adjustment gain Keq_r in accordance with the plant condition. In this embodiment, the adjustment gain Keq_r has a predetermined value Keq_r_high that is larger than one as its initial value. When a speed with which the vale is being closed is larger than a predetermined value (this indicates a condition that overshooting is likely to occur), the adjustment gain determining unit 111 changes the value of the adjustment gain Keq_r to a predetermined value Keq_r_low smaller than one, so as to decelerate the speed of change of the control output relative to the desired value. Otherwise, the adjustment gain determining unit 111 resets the value of the adjustment gain Keq_r to Keq_r_high to improve the capability that the control output follows the desired value.

A gradient parameter determining unit 112 determines the value of the gradient parameter Lrate in accordance with the plant condition. In this embodiment, the gradient parameter Lrate has a predetermined value Lrate_high as its initial value. When a speed with which the valve is being closed is larger than a predetermined value, the gradient parameter determining unit 112 changes the value of the gradient parameter Lrate to a predetermined value Lrate_low so as to suppress overshooting. Otherwise, the unit 112 resets the gradient parameter Lrate to the predetermined value Lrate_high (>Lrate_low) so as to improve the capability that the control output follows the desired value.

A gradually-approaching characteristic parameter determining unit 113 determines the value of the gradually-approaching characteristic parameter POLE_f in accordance with the plant condition. In this embodiment, the gradually-approaching characteristic parameter POLE_f has POLE_F_high as its initial value. When a speed with which the valve is being closed is larger than a predetermined value, the unit 113 changes the value of the gradually-approaching characteristic parameter POLE_f to a predetermined value POLE_f_low so as to suppress overshooting. Otherwise, the unit 113 resets it to the predetermined value POLE_F_high so as to improve the capability that the control output follows the desired value. Here, there is a relationship "the absolute value of POLE_f_high"<"the absolute value of POLE_f_low".

An equivalent control input calculating unit 114 calculates the equivalent control input Ueq based on the adjustment gain Keq_r determined according to the equation (16). Based on the gradient parameter Lrate thus determined and the desired value Lift_cmd determined in accordance with the engine operating condition, a filtered desired value calculating unit 115 generates a ramp signal Lift_cmd_ramp in accordance with the equations (17) through (20). The unit 115 further calculates a filtered desired value Lift_cmd_f based on the ramp signal Lift_cmd_ramp according to the equation (21).

A control input calculating unit 116 uses the filtered desired value Lift_cmd_f to calculate the reaching law input Urch and the nonlinear input Unl in accordance with the equations (103) and (104). The unit 116 further calculates the control input Ulift by adding the reaching law input Urch and the nonlinear input Unl to the equivalent control input Ueq calculated by the equivalent control input unit 114 (equation 101).

Figure 14:
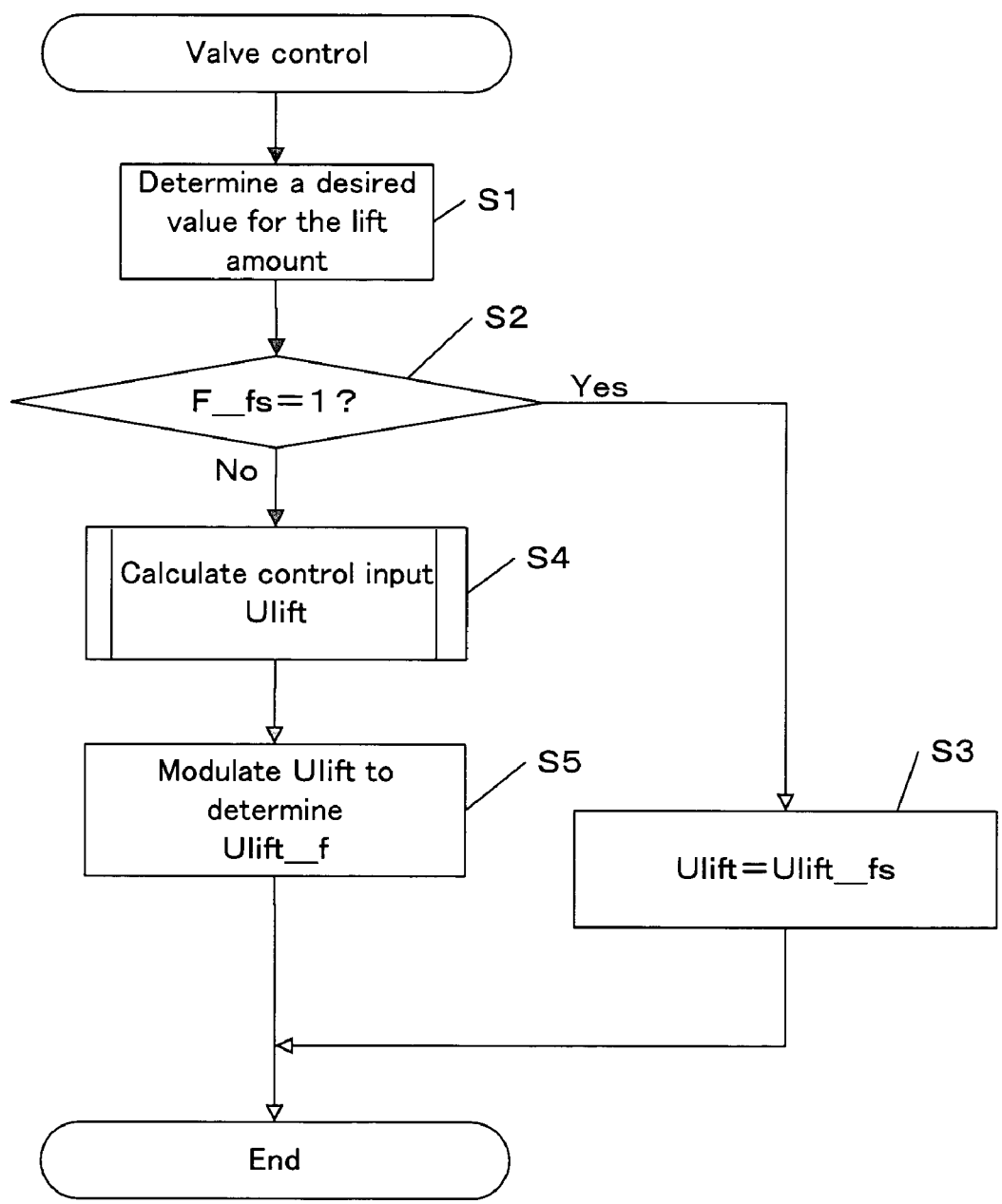
FIG. 14 is a flowchart of a process for controlling a valve in accordance with one embodiment of the present invention.

FIG. 14 is a flowchart of a process for controlling a valve in accordance with the embodiment shown in FIG. 13. This process is carried out at a predetermined time interval (for example, every five milliseconds).

Figure 15:
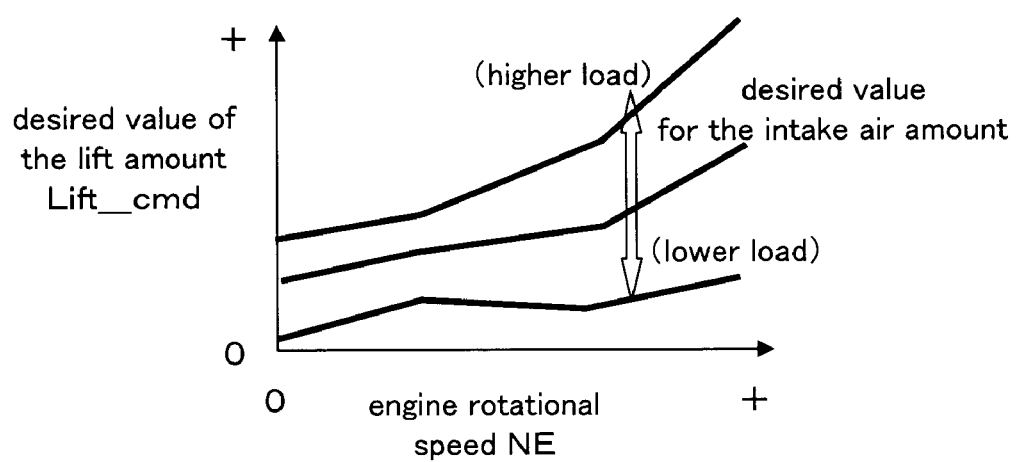
FIG. 15 schematically shows a map used for determining a desired value in accordance with one embodiment of the present invention.

In step S1, a desired value Lift_cmd for the lift is determined by referring to a map as shown in FIG. 15 based on the engine rotational speed NE and the engine load. As the engine rotational speed is higher and as the engine load is higher (the engine load can be represented by the desired value of the intake air amount), the desired value Lift_cmd of the lift is more increased.

In step S2, the value of a flag F_fs is examined. This flag is set to a value of 1 if a trouble occurs in the lift variable apparatus 26 or its related components (for example, ECU). This flag is also set to a value of 1 if interference occurs between the valve and the piston. When the decision of step S2 is Yes, a predetermined value Ulift_fs (for example, zero) is set in the control input Ulift (S3). If zero is set in the predetermined value Ulift_fs, the lift amount of the valve is controlled to a default value (for example, 10 mm).

Figure 16:
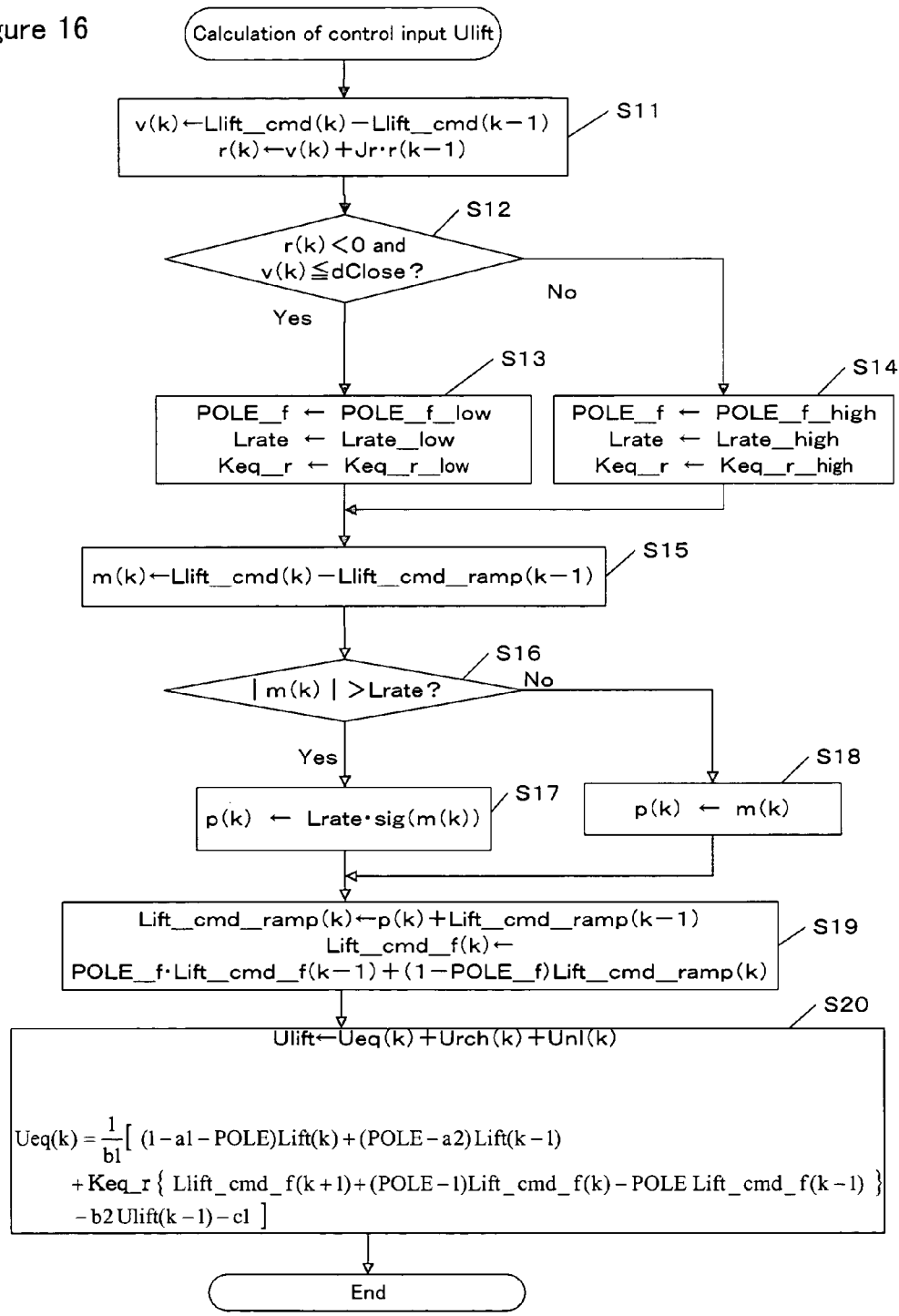
FIG. 16 is a flowchart of a process for calculating a control input in accordance with one embodiment of the present invention.

If the decision of step S2 is No, the process proceeds to step S4, in which the control input Ulift is calculated (FIG. 16). In step S5, a predetermined modulation algorithm is applied to the control input Ulift so as to generate the modulated signal Ulift_f. The modulated signal Ulift_f is input into the variable lift apparatus 26.

FIG. 16 is a flowchart of a process for calculating the control input Ulift, which is carried out in step S4 of FIG. 14.

In step S11, a change v of the desired value Lift_cmd of the lift is calculated in accordance with the above-described equation (24) and then a first-order delay filter is applied to the change v to calculate r in accordance with the equation (25). In step S12, based on the values of r and v, it is determined whether the valve has been moved toward the closed position by at least a predetermined amount dClose during a time period from the previous cycle (k−1) to the current cycle (k). If the decision of step S12 is Yes, POLE_f low is set in the gradually-approaching characteristic parameter POLE_f, Lrate_low is set in the gradient parameter Lrate and Keq_r_low is set in the adjustment gain Keq_r. If the decision of step S12 is No, POLE_f_high is set in the gradually-approaching characteristic parameter POLE_f, Lrate_high is set in the gradient parameter Lrate and Keq_r_high is set in the adjustment gain Keq_r.

In step S15, a difference m is calculated between the current desired value Lift_cmd(k) and the previous ramp signal value Lift_cmd_ramp(k−1) in accordance with the equation (17). In step S16, the difference m and the value of the gradient parameter Lrate is compared. If the decision of step S16 is Yes, the value of the gradient parameter Lrate is substituted into p in accordance with the equation (20) in step S17. If the decision of step S16 is No, the difference m is substituted into p in accordance with the equation (19) in step S18. In step S19, a ramp signal Lift_cmd_ramp is generated in accordance with the equation (18). Furthermore, a filtered desired value Lift_cmd_f is calculated by using the ramp signal Lift_cmd_ramp in accordance with the equation (21).

In step S20, an equivalent control input Ueq is calculated by using the adjustment gain Keq_r as shown by the equation (16). A reaching law input Urch and a nonlinear input Unl are calculated in accordance with the equations (103) and (104). Finally, the control input Ulift is calculated as a sum of the equivalent control input Ueq, the reaching law input Urch and the nonlinear input Unl.

Figure 17:
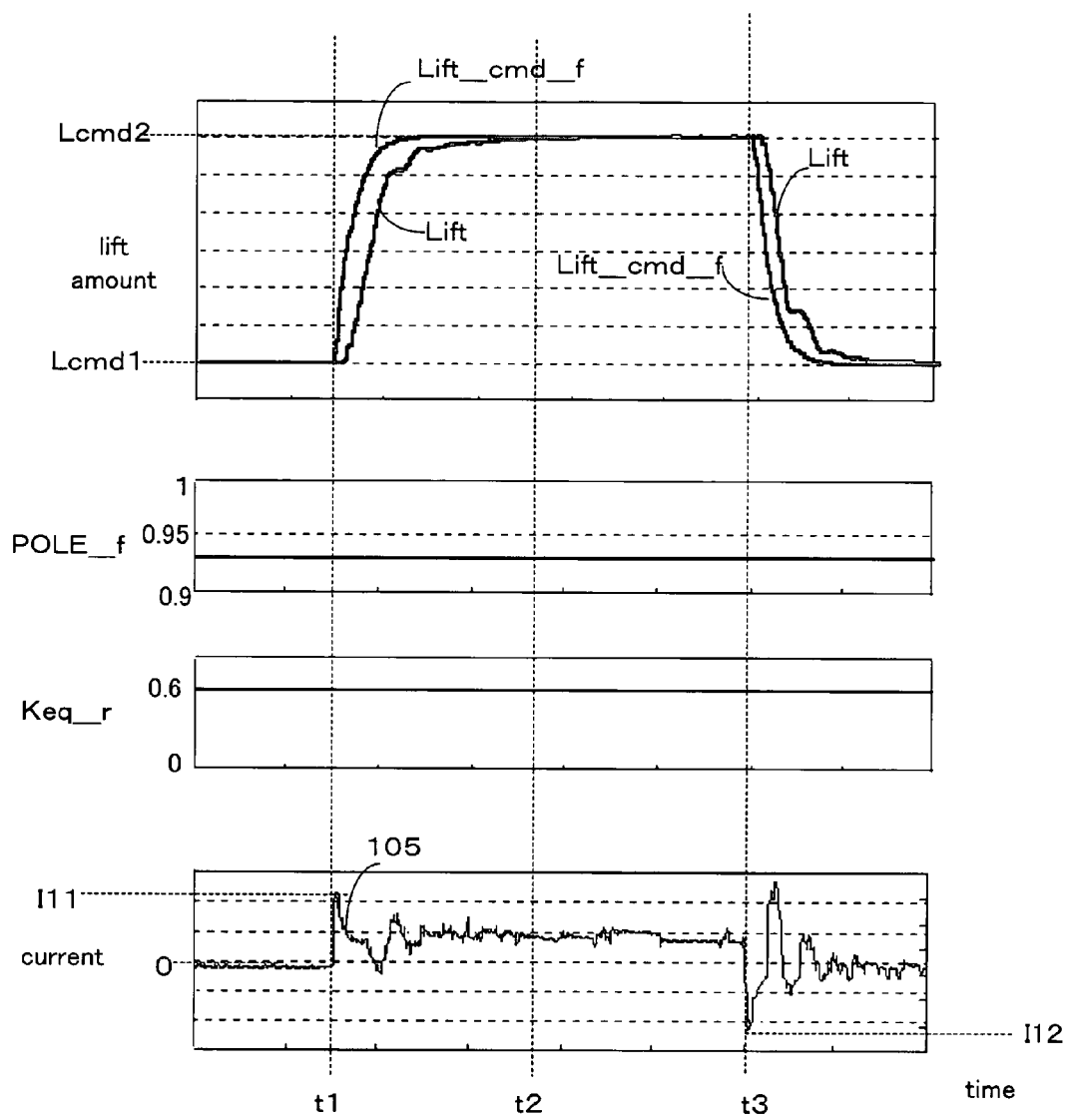
FIG. 17 schematically shows a result of a control in which an adjustment gain is set to a constant value in accordance with one embodiment of the present invention.
Figure 18:
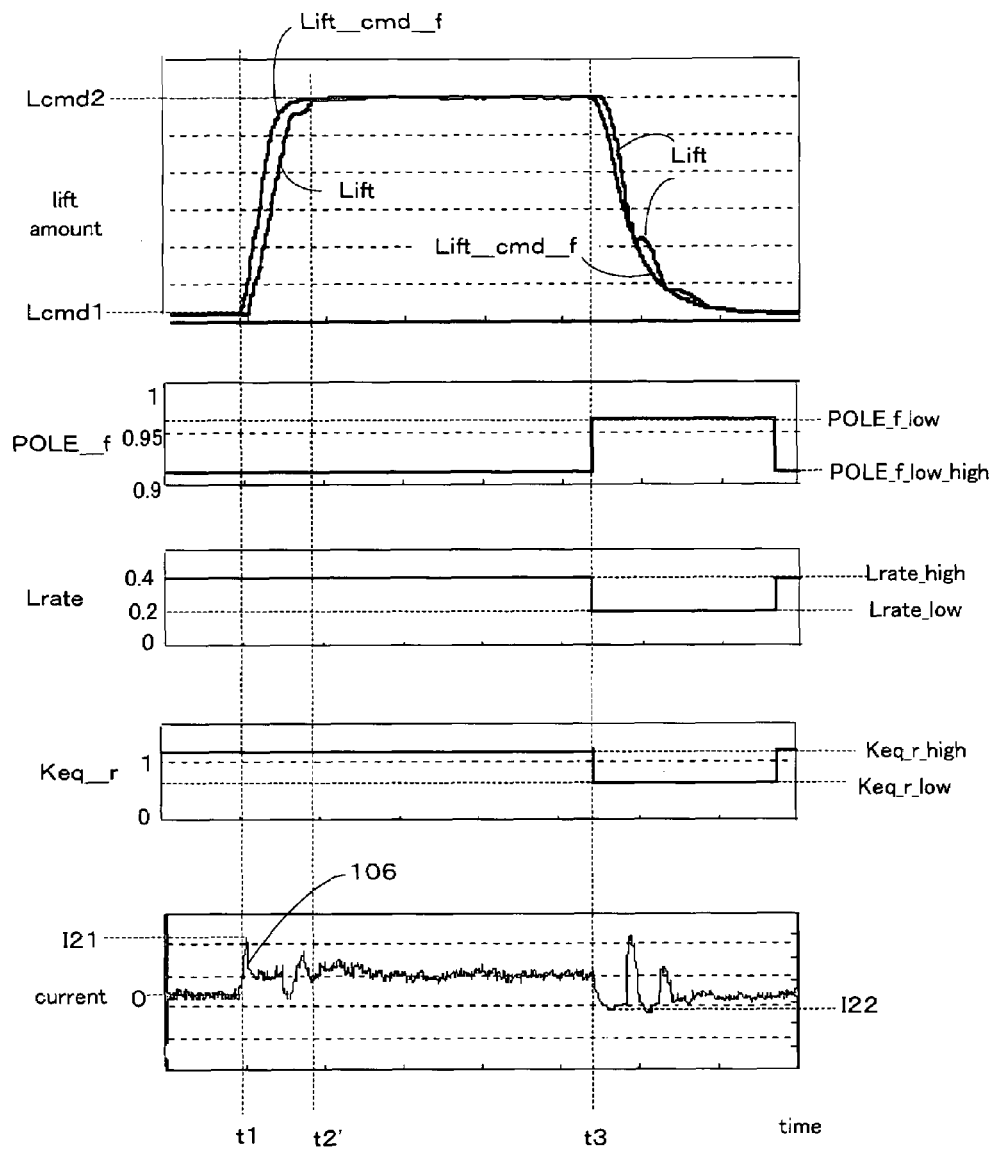
FIG. 18 schematically shows a result of a control in which an adjustment gain, a gradient parameter and a gradually-approaching characteristic parameter are switched in accordance with a plant condition in accordance with one embodiment of the present invention.

Referring to FIGS. 17 and 18, an example of a control result in accordance with one embodiment of the present invention will be described.

FIG. 17 shows a result of the control when the filtered desired value is calculated in accordance with the conventional equation (107). The adjustment gain Keq_r used in this example is fixed to a value (for example, 0.6) smaller than one so that overshooting can be suppressed. POLE_f, which is used as the desired value response parameter, is as conventionally fixed to a relatively-fast value (0.93 in this example). The gradient parameter Lrate is not used.

At time t1, the desired value Lift_cmd changes from Lcmd1 to Lcmd2 (not illustrated) and the valve starts to move toward the opened position. The filtered desired value Lift_f_cmd_f is calculated in accordance with the equation (107). Because the filtered desired value Lift_f_cmd_f is calculated without being transformed into a ramp signal, the filtered desired value Lift_cmd_f is abruptly rising. The control input Ulift is calculated so that the control output follows this filtered desired value Lift_cmd_f. Overshooting is completely suppressed by the function of the adjustment gain Keq_r. However, because the filtered desired value Lift_cmd_f rises abruptly, the lift amount Lift cannot catch up with the filtered desired value Lift_cmd_f. As a result, the time required for the lift amount Lift reaches Lcmd2 is long (it reaches around time t2, taking about 1 second from t1 to t2 according to this exemplary simulation). Reference numeral 105 shows the electric current applied to the variable lift apparatus 26 so as to drive the valve. Because the capability that the control output follows the desired value is not good, the maximum value of the electric current around the time t1 is relatively large.

At time t3, the valve starts to move toward the closed position. The filtered desired value Lift_f_cmd_f is calculated in accordance with the equation (107). Because the filtered desired value Lift_cmd_f is calculated without being transformed into a ramp signal, the filtered desired value Lift_cmd_f falls abruptly. The control input Ulift is calculated so that the control output follows this filtered desired value Lift_cmd_f. Overshooting is completely suppressed by the function of the adjustment gain Keq_r. However, because the filtered desired value Lift_cmd_f falls abruptly, the lift amount Lift cannot catch up with the filtered desired value Lift_cmd_f. As a result, the time required for the lift amount Lift to reach Lcmd1 is long. Because the capability that the control output follows the desired value is not good, the maximum value of the electric current around the time t3 is relatively large. Especially, when the valve is being closed, the electric current value becomes excessive so as to suppress the restoring force of the return spring.

Thus, when the valve is being opened, a delay with which the control output follows a desired value is likely to occur. If the value of the adjustment gain Keq_r is set to a value smaller than one when the valve is being opened, such a delay may increase. In contrast, when the valve is being closed, overshooting is likely to occur. If overshooting is completely suppressed by the adjustment gain Keq_r when the valve is being closed, such a delay may be caused.

FIG. 18 shows a case in which a speed of change of the control output relative to change of the desired value is changed by the adjustment gain Keq_r, the gradient parameter Lrate and the gradually-approaching characteristic parameter POLE_f in accordance with the plant condition.

At time t1, the desired value Lift_cmd changes from Lcmd1 to Lcmd2 (not illustrated) and the valve starts to move toward the opened position. As described above, a delay with which the control output follows the desired value is likely to occur when the valve is being opened. In order to suppress the delay, the gradient parameter Lrate is set to Lrate_high (0.4 in this example), the gradually-approaching characteristic parameter POLE_F is set to POLE_f_high (0.91 in this example) and the adjustment gain Keq_r is set to Keq_r_high (>1).

After a ramp signal is generated from the desired value Lift_cmd based on the gradient parameter Lrate in accordance with the equations (17) through (20), a filtered desired value Lift_cmd_f is calculated by using the ramp signal and the gradually-approaching characteristic parameter POLE_f. As can be seen from comparison to the line of Lift_cmd_f of FIG. 17, the filtered desired value Lift_cmd_f is generated so that it rises more moderately. The control input Ulift is calculated so that the control output follows the filtered desired value Lift_cmd_f. Because the filtered desired value Lift_cmd_f rises moderately, the lift amount Lift can follow the filtered desired value. In addition, the fact that the value of the adjustment gain Keq_r is set to a value larger than one also contributes to this preferable capability that the control output follows the desired value. As can be seen from comparison to FIG. 17, the time required for the lift amount Lift to reach the desired value Lcmd2 is shorter ((t2'−t1)< (t2−t1)). Reference numeral 106 shows the electric current applied to the variable lift apparatus 26 so as to drive the valve. Because the capability that the control output follows the desired value is good, the maximum value of the current around the time t1 is lower than FIG. 17 (I21<I11).

At time t3, the desired value Lift_cmd changes from Lcmd2 to Lcmd1 (not illustrated) and the valve starts to move toward the closed position. As described above, overshooting is likely to occur when the valve is being closed. In order to suppress the overshooting, the gradient parameter Lrate is switched to Lrate_low (0.2 in this example), the gradually-approaching characteristic parameter POLE_F is switched to POLE_f_low (0.96 in this example) and the adjustment gain Keq_r is switched to Keq_r_low (<1).

After a ramp signal is generated from the desired value Lift_cmd based on the gradient parameter Lrate, the filtered desired value Lift_cmd_f is calculated by using the ramp signal and the gradually-approaching characteristic parameter POLE_f. As can be seen from comparison to the line of Lift_cmd_f at time t3 in FIG. 17, the filtered desired value Lift_cmd_f is generated so that it falls more moderately. Because the gradient parameter Lrate and the gradually-approaching characteristic parameter POLE_f are switched to Lrate_low and POLE_f_low, respectively, a speed of change of the filtered desired value is lower than when the valve is being opened. Because the control input Ulift is calculated so that the control output follows the filtered desired value Lift_cmd_f having a moderate behavior, the lift amount Lift can follow the filtered desired value Lift_cmd_f without overshooting. In addition, the fact that the value of the adjustment gain Keq_r is set to a value smaller than one contributes to suppression of the overshooting. The time required for the desired value Lcmd1 to reach Lcmd1 is shorter than FIG. 17. Because the capability that the control output follows the desired value is good, the maximum value of the current around the time t3 is lower than the electric current 105 of FIG. 17 (I22<I12). In particular, there is almost no excessive current for suppressing the restoring force of the return spring.

Thus, by switching the values of the first and second parameters to most appropriate values in accordance with the valve condition, overshooting of the control output can be suppressed and the capability that the control output follows a desired value can be improved when the valve is being opened/closed.

In the embodiments described above referring to FIGS. 13 through 16 and 18, the values of all of the adjustment gain Keq_r, the gradient parameter Lrate and the gradually-approaching characteristic parameter POLE_f are determined in accordance with the plant condition. However, any one or two of these three parameters may be used to calculate the control input Ulift. For example, only the value of the adjustment gain Keq_r can be determined depending on the plant condition.

In the above-described embodiments, the amount of change per unit time of the desired value is used as the plant condition, and according to this amount, it is determined whether or not the valve is being moved toward the closed position by more than a predetermined amount. The values of the first and second parameters are switched between a condition where the valve is being closed and the other conditions (see S11 and S12 of FIG. 16). It should be noted that the condition for switching the values of the parameters can be variously established depending on the plant. For example, the parameter values may be switched in accordance with three conditions: when the valve is being opened, when the valve is being closed, and when the valve is not working. Further, the values of the above-described parameters may be changed in accordance with a speed of change of the actually-detected lift amount.

The control input may be calculated by using another control scheme other than the response assignment control. Even in such a case, a speed of change of the control output can be changed by weighting a component comprising the control input with the adjustment gain. Furthermore, a speed of change of the control output can be changed by correcting the desired value to a ramp-shaped signal and/or an exponential-function shaped signal by the gradient parameter and/or the gradually-approaching characteristic parameter.

The above-described control technique can be applied to various plants. For example, a variable phase apparatus that is capable of changing the phase of the cam can be controlled as a plant. The variable phase apparatus can be implemented by, for example, a magnetic brake and a planetary gear mechanism.

A variable compression ratio apparatus that is capable of changing a compression ratio within a combustion chamber can be controlled as a plant. Furthermore, the above-described control technique can be applied to an actuator for changing an opening angle of a throttle valve disposed in an intake manifold of an engine, an actuator for automatic transmission and so on.

The present invention can be applied to a general-purpose internal-combustion engine (for example, a vessel-propelling engine such as an outboard motor).

What is claimed is:

1. An apparatus for controlling a plant, comprising a controller for determining a control input into the plant to cause a control output of the plant to converge to a desired value, the control input including an equivalent control input, the controller configured to:
 determine a value of at least one parameter for adjusting a speed of change of the control output relative to change of the desired value in accordance with a plant condition; and
 determine the equivalent control input based on the at least one parameter having the value thus determined, wherein the at least one parameter includes a first parameter for changing a speed of change of the equivalent control input relative to change of the desired value, the first parameter weighting a feed-forward term that is one of components of the equivalent control input, the feed-forward term being calculated based on the desired value.

2. The apparatus of claim 1, wherein the controller is configured to perform a response assignment control that is capable of specifying a speed with which the control output converges to the desired value; and wherein the equivalent control input confines a state quantity of the plant on a switching line defined in the response assignment control.

3. The apparatus of claim 2, wherein the response assignment control is a 2-degree-of-freedom response assignment control that is capable of separately specifying a speed with which the control output follows the desired value and a speed with which an error between the control output and the desired value converges when disturbance is applied to the plant.

4. The apparatus of claim 1, wherein when the plant reaches a condition in which there is a possibility that overshooting occurs, the first parameter is set to a first value to decrease the relative speed, and when the plant exits the condition, the first parameter is reset to a second value to restore the relative speed.

5. The apparatus of claim 1, wherein when the plant reaches a condition in which there is a possibility that overshooting occurs, the first parameter is set to a first value to decrease the relative speed, and when the plant reaches a condition in which there is a possibility that a delay with which the control output follows the desired value occurs, the first parameter is set to a second value to increase the relative speed.

6. The apparatus of claim 1, wherein the plant condition includes a speed of change of the desired value.

7. The apparatus of claim 1, wherein the plant is a mechanism that is capable of changing a lift amount of a valve disposed in an internal-combustion engine.

8. The apparatus of claim 7, wherein the plant condition indicates a condition where the valve is being closed or a condition where the valve is being opened.

9. An apparatus for controlling a plant, the apparatus comprising:

a controller for determining a control input into the plant to cause a control output of the plant to converge to a desired value, the controller configured to:
 determine a value of at least one parameter for adjusting a speed of change of the control output relative to change of the desired value in accordance with a plant condition; and
 determine the control input based on the parameter having the value thus determined, wherein the parameter includes a second parameter for changing the relative speed via a corrected desired value that is determined by correcting the desired value; and a unit configured to generate the corrected desired value in accordance with the second parameter, wherein the controller determines the control input so that the control output follows the corrected desired value.

10. The apparatus of claim 9, wherein the second parameter includes a gradient parameter; and wherein the unit generates, as the corrected desired value, a ramp-shaped signal having a gradient corresponding to the gradient parameter relative to change of the desired value.

11. The apparatus of claim 9, wherein the second parameter includes a gradually-approaching characteristic parameter; and wherein the unit generates, as the corrected desired value, an exponential-function shaped signal having a gradually-approaching characteristic corresponding to the gradually-approaching characteristic parameter relative to change of the desired value.

12. The apparatus of claim 11, wherein the controller is configured to perform a 2-degree-of-freedom response assignment control that is capable of separately specifying a speed with which the control output follows the desired value and a speed with which an error between the control output and the desired value converges when disturbance is applied to the plant, and wherein the gradually-approaching characteristic parameter is represented by the speed with which the control output follows the desired value.

13. The apparatus of claim 12, wherein the exponential-function shaped signal is generated by filtering the desired value through use of the gradually-approaching characteristic parameter as a filter coefficient.

14. The apparatus of claim 9, wherein when the plant reaches a condition in which there is a possibility that overshooting occurs, the second parameter is set to a first value to decrease the relative speed, and when the plant exits the condition, the second parameter is reset to a second value to restore the relative speed.

15. The apparatus of claim 9, wherein when the plant reaches a condition in which there is a possibility that overshooting occurs, the second parameter is set to a first value to decrease the relative speed, and when the plant reaches a condition in which there is a possibility that a delay with which the control output follows the desired value occurs, the second parameter is set to a second value to increase the relative speed.

16. The apparatus of claim 9, wherein the plant condition includes a speed of change of the desired value.

17. The apparatus of claim 9, wherein the plant is a mechanism that is capable of changing a lift amount of a valve disposed in an internal-combustion engine.

18. The apparatus of claim 17, wherein the plant condition indicates a condition where the valve is being closed or a condition in which the valve is being opened.

19. A method for controlling a plant, the method comprising the steps of:

determining a control input into the plant to cause a control output of the plant to converge to a desired value, the control input including an equivalent control input by determining a value of at least one parameter for adjusting a speed of change of the control output relative to change of the desired value in accordance with a plant condition; and determining an equivalent control input based on the at least one parameter having the value thus determined, wherein the at least one parameter includes a first parameter for changing a speed of change of the equivalent control input relative to change of the desired value, the first parameter weighting a feed-forward term that is one of components of the equivalent control input, the feed-forward term being calculated based on the desired value.

20. The method of claim 19, further comprising performing a response assignment control that is capable of specifying a speed with which the control output converges to the desired value; and wherein the equivalent control input confines a state quantity of the plant on a switching line defined in the response assignment control.

21. The method of claim 20, wherein the response assignment control is a 2-degree-of-freedom response assignment control that is capable of separately specifying a speed with which the control output follows the desired value and a speed with which an error between the control output and the desired value converges when disturbance is applied to the plant.

22. The method of claim 19, further comprising:

setting the first parameter to a first value to decrease the relative speed when the plant reaches a condition where there is a possibility that overshooting occurs; and resetting the first parameter to a second value to restore the relative speed when the plant exits the condition.

23. The method of claim 19, further comprising:

setting the first parameter to a first value to decrease the relative speed when the plant reaches a condition in which there is a possibility that overshooting occurs; and setting the first parameter to a second value to increase the relative speed when the plant reaches a condition in which there is a possibility that a delay with which the control output follows the desired value occurs.

24. The method of claim 19, wherein the plant condition includes a speed of change of the desired value.

25. The method of claim 19, wherein the plant is a mechanism that is capable of changing a lift amount of a valve disposed in an internal-combustion engine.

26. The method of claim 25, wherein the plant condition indicates a condition where the valve is being closed or a condition in which the valve is being opened.

27. A method for controlling a plant, the method comprising the steps of:

determining a control input into the plant to cause a control output of the plant to converge to a desired value by determining a value of at least one parameter for adjusting a speed of change of the control output relative to change of the desired value in accordance with a plant condition, and determining the control input based on the at least one parameter having the value thus determined, wherein the at least one parameter includes a second parameter for changing the relative speed via a corrected desired value; and determining the corrected desired value in accordance with the second parameter and determining the control input so that the control output follows the corrected desired value.

28. The method of claim 27, wherein the second parameter includes a gradient parameter; and wherein the step of determining the corrected desired value further includes generating, as the corrected desired value, a ramp-shaped signal having a gradient corresponding to the gradient parameter relative to change of the desired value.

29. The method of claim 27 wherein the second parameter includes a gradually-approaching characteristic parameter; and wherein the step of determining the corrected desired value further includes generating, as the corrected desired value, an exponential-function shaped signal having a gradually-approaching characteristic corresponding to the gradually-approaching characteristic parameter relative to change of the desired value.

30. The method of claim 29, further comprising performing a 2-degree-of-freedom response assignment control that is capable of separately specifying a speed with which the control output follows the desired value and a speed with which an error between the control output and the desired value converges when disturbance is applied to the plant; the gradually-approaching characteristic parameter represented by the speed with which the control output follows the desired value.

31. The method of claim 30, further comprising generating the exponential-function shaped signal by filtering the desired value through use of the gradually-approaching characteristic parameter as a filter coefficient.

32. The method of claim 27, further comprising:
setting the second parameter to a first value to decrease the relative speed when the plant reaches a condition where there is a possibility that overshooting occurs; and
resetting the second parameter to a second value to restore the relative speed when the plant exits the condition.

33. The method of claim 27, further comprising:
setting the second parameter to a first value to decrease the relative speed when the plant reaches a condition where there is a possibility that overshooting occurs; and
setting the second parameter to a second value to increase the relative speed when the plant reaches a condition where there is a possibility that a delay with which the control output follows the desired value occurs.

34. The method of claim 27, wherein the plant condition includes a speed of change of the desired value.

35. The method of claim 27, wherein the plant is a mechanism that is capable of changing a lift amount of a valve disposed in an internal-combustion engine.

36. The method of claim 35, wherein the plant condition indicates a condition where the valve is being closed or a condition in which the valve is being opened.

* * * * *